(12) United States Patent
Tata et al.

(10) Patent No.: US 12,450,420 B2
(45) Date of Patent: Oct. 21, 2025

(54) GENERATION AND OPTIMIZATION OF OUTPUT REPRESENTATION

(71) Applicant: ACCENTURE GLOBAL SOLUTIONS LIMITED, Dublin (IE)

(72) Inventors: Swati Tata, Bangalore (IN); Ditty Mathew, Vaikom (IN); Srivasan Sridharan, Bangalore (IN); Himani Shukla, Shastri (IN); Chinnappa Guggilla, Bangalore (IN); Kamlesh Narayan Chaudhari, District Satara (IN); Divyayan Dey, Midnapore (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 170 days.

(21) Appl. No.: 17/703,801

(22) Filed: Mar. 24, 2022

(65) Prior Publication Data
US 2023/0306070 A1    Sep. 28, 2023

(51) Int. Cl.
*G06F 40/103* (2020.01)
*G06F 40/186* (2020.01)
*G06N 20/00* (2019.01)

(52) U.S. Cl.
CPC .......... *G06F 40/103* (2020.01); *G06F 40/186* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 6,230,196 B1 | 5/2001 | Guenthner et al. | |
| 7,565,359 B2 | 7/2009 | Nazem et al. | |
| 8,798,989 B2* | 8/2014 | DelRocco | G06F 40/30 704/10 |
| 10,073,923 B2* | 9/2018 | Koren | G06F 16/972 |
| 10,089,560 B2 | 10/2018 | Nakamura | |
| 10,534,845 B2* | 1/2020 | Noursalehi | G06F 40/106 |
| 10,783,405 B2 | 9/2020 | Rohde et al. | |
| 10,896,214 B2* | 1/2021 | Kummamuru | G06F 16/951 |
| 10,970,463 B2* | 4/2021 | Noursalehi | G06N 20/00 |
| 11,086,515 B2* | 8/2021 | Lee | G06F 3/04886 |
| 11,178,336 B1* | 11/2021 | Rakshit | H04N 23/633 |

(Continued)

OTHER PUBLICATIONS

First Examination Report, Indian App. No. 202314018978 dated Jul. 16, 2025.

*Primary Examiner* — Tamara T Kyle
*Assistant Examiner* — Tyler Schallhorn
(74) *Attorney, Agent, or Firm* — Mannava & Kang, P.C.

(57) ABSTRACT

Systems and methods for generating an output representation are disclosed. A system may include a processor including a representation generator. The representation generator may receive an input data comprising an input content and an instruction. The representation generator may include a parsing engine to parse the input data to obtain parsed information. The representation generator include a mapping engine to map the parsed information with a pre-stored base template pertaining to a pre-defined module, to obtain a mapped template. The representation generator may generate, through a machine learning (ML) model, based on the mapped template, an output representation in a pre-defined format. The output representation may correspond to the expected representation of the input content.

15 Claims, 23 Drawing Sheets

(56) References Cited

U.S. PATENT DOCUMENTS

| | | | |
|---|---|---|---|
| 11,392,754 B2* | 7/2022 | Nelson | G06F 40/117 |
| 11,429,603 B2* | 8/2022 | Dinh | G06F 16/2423 |
| 11,481,545 B1* | 10/2022 | Aviles | G06F 40/186 |
| 11,586,816 B2* | 2/2023 | Hou | G06F 40/58 |
| 11,605,187 B1* | 3/2023 | Hasanain | G06F 18/214 |
| 11,720,741 B2* | 8/2023 | Nelson | G06F 40/169 |
| | | | 715/234 |
| 11,860,759 B2* | 1/2024 | Kaitha | G06F 11/3692 |
| 2004/0215479 A1 | 10/2004 | Dorsey et al. | |
| 2009/0265611 A1* | 10/2009 | Sengamedu | G06F 16/9577 |
| | | | 715/234 |
| 2013/0138426 A1* | 5/2013 | DelRocco | G06F 16/907 |
| | | | 704/E11.001 |
| 2014/0236875 A1* | 8/2014 | Phillipps | G06Q 30/0202 |
| | | | 706/12 |
| 2016/0147507 A1 | 5/2016 | Cheng et al. | |
| 2017/0329747 A1* | 11/2017 | Noursalehi | G06N 7/01 |
| 2017/0344656 A1* | 11/2017 | Koren | G06F 3/0484 |
| 2019/0163691 A1* | 5/2019 | Brunet | G06F 16/35 |
| 2019/0325626 A1* | 10/2019 | Tao | G06T 11/60 |
| 2019/0339861 A1* | 11/2019 | Lee | G06V 30/1423 |
| 2019/0370397 A1* | 12/2019 | Kummamuru | G06F 40/295 |
| 2020/0019609 A1* | 1/2020 | Yu | G06F 40/186 |
| 2020/0065357 A1* | 2/2020 | Noursalehi | G06F 40/106 |
| 2020/0293604 A1* | 9/2020 | Nelson | G06F 40/169 |
| 2020/0293605 A1* | 9/2020 | Nelson | G06N 20/00 |
| 2021/0142356 A1 | 5/2021 | Samanta et al. | |
| 2021/0192397 A1 | 6/2021 | Rastogi et al. | |
| 2021/0200943 A1* | 7/2021 | Aviyam | G06F 16/953 |
| 2021/0209102 A1* | 7/2021 | Dinh | G06N 5/04 |
| 2021/0248425 A1 | 8/2021 | Zong et al. | |
| 2021/0350088 A1* | 11/2021 | Ravi | G06F 40/284 |
| 2021/0352219 A1* | 11/2021 | Rakshit | H04N 23/64 |
| 2022/0012434 A1* | 1/2022 | Pandit | G06V 30/10 |
| 2022/0107790 A1* | 4/2022 | Naghshin | G06F 8/38 |
| 2022/0147702 A1* | 5/2022 | Li | G06N 3/045 |
| 2022/0366127 A1* | 11/2022 | Desh | G06Q 50/18 |
| 2022/0398379 A1* | 12/2022 | Hou | G06F 40/30 |
| 2022/0405314 A1* | 12/2022 | Du | G06F 16/3344 |
| 2023/0011315 A1* | 1/2023 | Kaitha | G06N 20/00 |
| 2023/0060678 A1* | 3/2023 | Netherwood | G06F 3/1285 |

* cited by examiner

| Template A | Template B | Template C | Template D | Template E | Template F |
|---|---|---|---|---|---|
| BG Hero Image with CTA | BG Hero Image with CTA | Hero/Banner Image | Hero/Banner Image | BG Hero Image with CTA | BG Hero Image with CTA |
| 2-UP Image Layout | Header/Sub-Header with Alternating Image-Text Blocks | Header, Sub-Header with CTA | Header, Sub-Header with CTA | Tagline | Header, Sub-Header with 3UP Images and Links |
| 3-UP Image Layout w/ Sub-Header Links CTA | 2-Option Survey | Header, Sub-Header with 3UP Images and Links | 2-UP Images with Header Sub-Header Links X2 | 2-UP Image Full Width | Hero/Banner Image |
| Dynamic Banner with Links | Dynamic Banner with Links | Hero/Banner Image | 2-Option Survey | Image Sub-Header with 3UP Images – Full Width | Image Sub-Header with 3UP Images – Full Width |
| Dynamic Banner | Dynamic Banner | Dynamic Banner with Links | Dynamic Banner with Links | 2-UP Image Layout with CTA | 4 Option Survey |
| | | Dynamic Banner | Dynamic Banner | 3 Option Survey | Dynamic Banner with Links |
| | | Contradiction | If Patient Needed Drug If He/She Not Had Chest-Pain? | Dynamic Banner with Links | Dynamic Banner |
| | | | | Dynamic Banner | |

FIG. 4

```
{
  "bg_hero_image_w/_cta":{{
    "image":"<Image_URL>",
    "ctatext":"SHOPNOW",
    "link":"<Link_URL>"
  }},
  "2-up_image_layout":{{
    "header":"",
    "subheader":"LOREM PSUM DOLOR SIT AMET Lorem ipsum dolor sit amet brem ipsum dolor sit amet brem ipsum.",
    "image1":"<Image_URL>",
    "header":"",
    "subhead1":"Lorem ipsum dolor sit amet lorem ipsum dolor sit amet brem ipsum",
    "linktext1":"READMORE",
    "link1":"<Link_URL>",
    "image2":"<Image_URL>",
    "header2":"",
    "subhead2":"Lorem ipsum Dolor sit amet lorem ipsum dolor sit ametlorem ipsum",
    "linktext2":"READMORE",
    "link2":"<Link_URL>"
  }}
}
```

504

506

LOREM IPSUM DOLOR SIT AMET LOREM IPSUM DOLOR SIT AMET LOREM IP SUM DOLOR SIT AMET LOREM IPSUM

SHOP NOW

LOREM IPSUM DOLOR SIT AMET LOREM IP SUM DOLOR SIT AMET LOREM IPSUM

LOREM IPSUM DOLOR SIT AMET LOREM IP SUM DOLOR SIT AMET LOREM IPSUM

*FIG. 5B*

```
<td class="drop mobile-pad-bottom "style="padding: 0 0 20px 0px"">
  <table align="center" border="0" cellpadding="0" cellspacing="0" width."100X">
    <tbody><tr>
      <td align="center" class="drop" style="padding: 0 5px 0 S5px;" valign="top">
        <a href="replaced link">
          <img alt="" border="0" height="250" src="Replaced_Image_link.png" style="width: 270px ;height: 250px; display: block; "width="270">
        </a>
      </td>
    </tr>
    <tr>
      <td align="center" style="font-family: Arial, Verdana, sans-serif; font-size: 17px ;line-height: 19px; color: #5e5e5e; mso-line-height: exactly; text-align: center; padding: 15px 20px 0 20px; "valign="top">
        WeddingMakeupTips
      </td>
    </tr>
```

| ORDER | EMAIL TEMPLATE | CONTENT A |
|---|---|---|
| - | HEADER | |
| - | BANNER (IF AVAILABLE) | |
| 1 | BG HERO IMAGE WITH CTA | |
| | IMAGE | <IMAGE_URL> |
| | CTA TEXT | SHOP NOW |
| | LINK | <LINK URL> |
| | MOBILE FONT-SIZE | |
| | CTA TEXT | SHOP NOW |
| | LINK | <LINK URL> |
| 2 | 2-UP IMAGE LAYOUT | DYNAMIC BANNER WITH LINKS |
| | HEADER | DYNAMIC BANNER |
| | SUB HEADER | LOREM IPSUM DOLOR SIT AMET LOREM IPSUM DOLOR SIT AMET LOREM IP SUM DOLOR SIT AMET LOREM IPSUM |
| | IMAGE 1 | <IMAGE_URL> |
| | HEADER 1 | HERO/BANNER IMAGE |
| | SUBHEAD 1 | LOREM IPSUM DOLOR SIT AMET LOREM IPSUM DOLOR SIT AMET LOREM IPSUM DOLOR SIT AMET |
| | LINK TEXT 1 | READ MORE |
| | LINK 1 | <LINK URL> |
| | IMAGE 2 | <IMAGE_URL> |
| | HEADER 2 | |
| | SUBHEAD 2 | LOREM IPSUM DOLOR SIT AMET LOREM IPSUM DOLOR SIT AMET LOREM IPSUM DOLOR SIT AMET |
| | LINK TEXT 2 | READ MORE |
| | LINK 2 | <LINK URL> |
| | MOBILE FONT-SIZE | |
| 3 | 2-UP IMAGE LAYOUT | |
| | HEADER | |
| | SUB HEADER | |
| | IMAGE 1 | <IMAGE_URL> |
| | HEADER 1 | HERO/BANNER IMAGE |
| | SUBHEAD 1 | LOREM IPSUM DOLOR SIT AMET LOREM IPSUM DOLOR SIT AMET LOREM IPSUM DOLOR SIT AMET |
| | LINK TEXT 1 | READ MORE |
| | LINK 1 | <LINK URL> |
| | IMAGE 2 | <IMAGE_URL> |
| | HEADER 2 | |
| | SUBHEAD 2 | LOREM IPSUM DOLOR SIT AMET LOREM IPSUM DOLOR SIT AMET LOREM IPSUM DOLOR SIT AMET |
| | LINK TEXT 2 | READ MORE |
| | LINK 2 | <LINK URL> |
| | MOBILE FONT-SIZE | |

902

904 — FEATURE VECTOR: (1,1,1,0,1,1,2,2,2,2,2,2,2,2,2,0)

| ORDER | EMAIL TEMPLATE | CONTENT A |
|---|---|---|
| - | HEADER | |
| - | BANNER (IF AVAILABLE) | |
| 1 | BG HERO IMAGE WITH CTA | |
| | IMAGE | <IMAGE_URL> |
| | CTA TEXT | SHOP NOW |
| | LINK | <LINK URL> |
| | MOBILE FONT-SIZE | |
| | CTA TEXT | SHOP NOW |
| | LINK | <LINK URL> |
| 2 | 2-UP IMAGE LAYOUT | DYNAMIC BANNER WITH LINKS |
| | HEADER | DYNAMIC BANNER |
| | SUB HEADER | LOREM IPSUM DOLOR SIT AMET LOREM IPSUM DOLOR SIT AMET LOREM IP SUM DOLOR SIT AMET LOREM IPSUM |
| | IMAGE 1 | <IMAGE_URL> |
| | HEADER 1 | HERO/BANNER IMAGE |
| | SUBHEAD 1 | LOREM IPSUM DOLOR SIT AMET LOREM IPSUM DOLOR SIT AMET LOREM IPSUM DOLOR SIT AMET |
| | LINK TEXT 1 | READ MORE |
| | LINK 1 | <LINK URL> |
| | IMAGE 2 | <IMAGE_URL> |
| | HEADER 2 | |
| | SUBHEAD 2 | LOREM IPSUM DOLOR SIT AMET LOREM IPSUM DOLOR SIT AMET LOREM IPSUM DOLOR SIT AMET |
| | LINK TEXT 2 | READ MORE |
| | LINK 2 | <LINK URL> |
| | MOBILE FONT-SIZE | |
| 3 | 2-UP IMAGE LAYOUT | |
| | HEADER | |
| | SUB HEADER | |
| | IMAGE 1 | <IMAGE_URL> |
| | HEADER 1 | HERO/BANNER IMAGE |
| | SUBHEAD 1 | LOREM IPSUM DOLOR SIT AMET LOREM IPSUM DOLOR SIT AMET LOREM IPSUM DOLOR SIT AMET |
| | LINK TEXT 1 | READ MORE |
| | LINK 1 | <LINK URL> |
| | IMAGE 2 | <IMAGE_URL> |
| | HEADER 2 | |
| | SUBHEAD 2 | LOREM IPSUM DOLOR SIT AMET LOREM IPSUM DOLOR SIT AMET LOREM IPSUM DOLOR SIT AMET |
| | LINK TEXT 2 | READ MORE |
| | LINK 2 | <LINK URL> |
| | MOBILE FONT-SIZE | |

952

954 ⟶ FEATURE VECTOR: (1,1,1,0,1,1,2,2,1,2,2,2,2,1,2,2,0)

*FIG. 9B*

GENERATION AND OPTIMIZATION OF OUTPUT REPRESENTATION

BACKGROUND

Digital marketing may require digital representation of data or information pertaining to one or more products or services. The representation of data may be in a format such as, for example, Hypertext Markup Language (HTML) or other formats. The optimization of representation may be important as a well-presented information may play a crucial role in enhancing product or service demand to improve sales. However, preparing the representation may be a difficult task as it may involve extensive manual effort and time for searching/mapping of suitable templates and for manually optimizing the templates to meet expectations of a user. In addition, users such as, for example, developers/marketing executives may take considerable amount of time for preparing the representation for marketing purposes due to lack of technical skills or resources.

Further, even in case of automated generation of the representation, an interpretation of input instructions may be challenging, as the instructions may be present in different types of complex formats. Further, a user may need to manually optimize the output representation to match with an expected representation. In addition, the user may need to manually annotate the generated HTML to incorporate the changes beyond the instructions and based on user's previous experience. The overall process can be very tedious and expensive.

SUMMARY

An embodiment of present disclosure includes a system including a processor. The processor may include a representation generator. The representation generator may receive an input data comprising an input content and an instruction. The input content may include information to be displayed in an expected representation, and the instruction may correspond to one or more attributes related to the expected representation of the input content. The representation generator include a parsing engine to parse the input data to obtain parsed information. The representation generator may include a mapping engine to map the parsed information with a pre-stored base template pertaining to a pre-defined module, to obtain a mapped template. In an embodiment, the mapping may be performed based on comparative identification of pre-defined portions in the pre-stored base template with respect to the parsed information. The representation generator may generate, through a machine learning (ML) model, based on the mapped template, an output representation in a pre-defined format. In an embodiment, the output representation may be generated by retaining, in the pre-stored base template, the corresponding pre-defined portions that are present in the parsed information. The output representation may correspond to the expected representation of the input content.

Another embodiment of the present disclosure may include a method for generating an output representation. The method may include a step of receiving, by a processor, an input data including an input content and an instruction. In an example embodiment, the input content may include information to be displayed in an expected representation. In an example embodiment, the instruction may correspond to one or more attributes related to the expected representation of the input content. The method may include a step of parsing, by the processor, the input data to obtain parsed information. The method includes a step of mapping, by the processor, the parsed information with a pre-stored base template to obtain a mapped template. The pre-stored base template may pertain to a pre-defined module. In an embodiment, the mapping may be performed based on comparative identification of pre-defined portions in the pre-stored base template with respect to the parsed information. The method may include a step of generating, by the processor, based on the mapped template, an output representation in a pre-defined format. In an example embodiment, the output representation may be generated by retaining, in the pre-stored base template, the corresponding pre-defined portions that are present in the parsed information. The output representation corresponds to the expected representation of the input content.

Yet another embodiment of the present disclosure may include a non-transitory computer readable medium comprising machine executable instructions that may be executable by a processor to receive an input data including an input content and an instruction. In an example embodiment, the input content may include information to be displayed in an expected representation. In an example embodiment, the instruction may correspond to one or more attributes related to the expected representation of the input content. The processor may parse the input data to obtain parsed information. The processor may map the parsed information with a pre-stored base template to obtain a mapped template. The pre-stored base template may pertain to a pre-defined module. In an embodiment, the mapping may be performed based on comparative identification of pre-defined portions in the pre-stored base template with respect to the parsed information. The processor may generate, based on the mapped template, an output representation in a pre-defined format. In an example embodiment, the output representation may be generated by retaining, in the pre-stored base template, the corresponding pre-defined portions that are present in the parsed information. The output representation corresponds to the expected representation of the input content.

BRIEF DESCRIPTION OF DRAWINGS

FIG. 4 illustrates an exemplary block diagram representation showing a summary of data elements pertaining to pre-stored base templates, according to an example embodiment of the present disclosure.

FIGS. 5A-5B illustrate exemplary representations pertaining to generated output representation, according to an example embodiment of the present disclosure.

FIGS. 7A-7B illustrate exemplary representations showing replacement of features in a template with input content, according to an example embodiment of the present disclosure.

FIGS. 9A-9B illustrate exemplary representations showing feature vector based estimation of similarity metrics, according to an example embodiment of the present disclosure.

DETAILED DESCRIPTION

Figure 1:
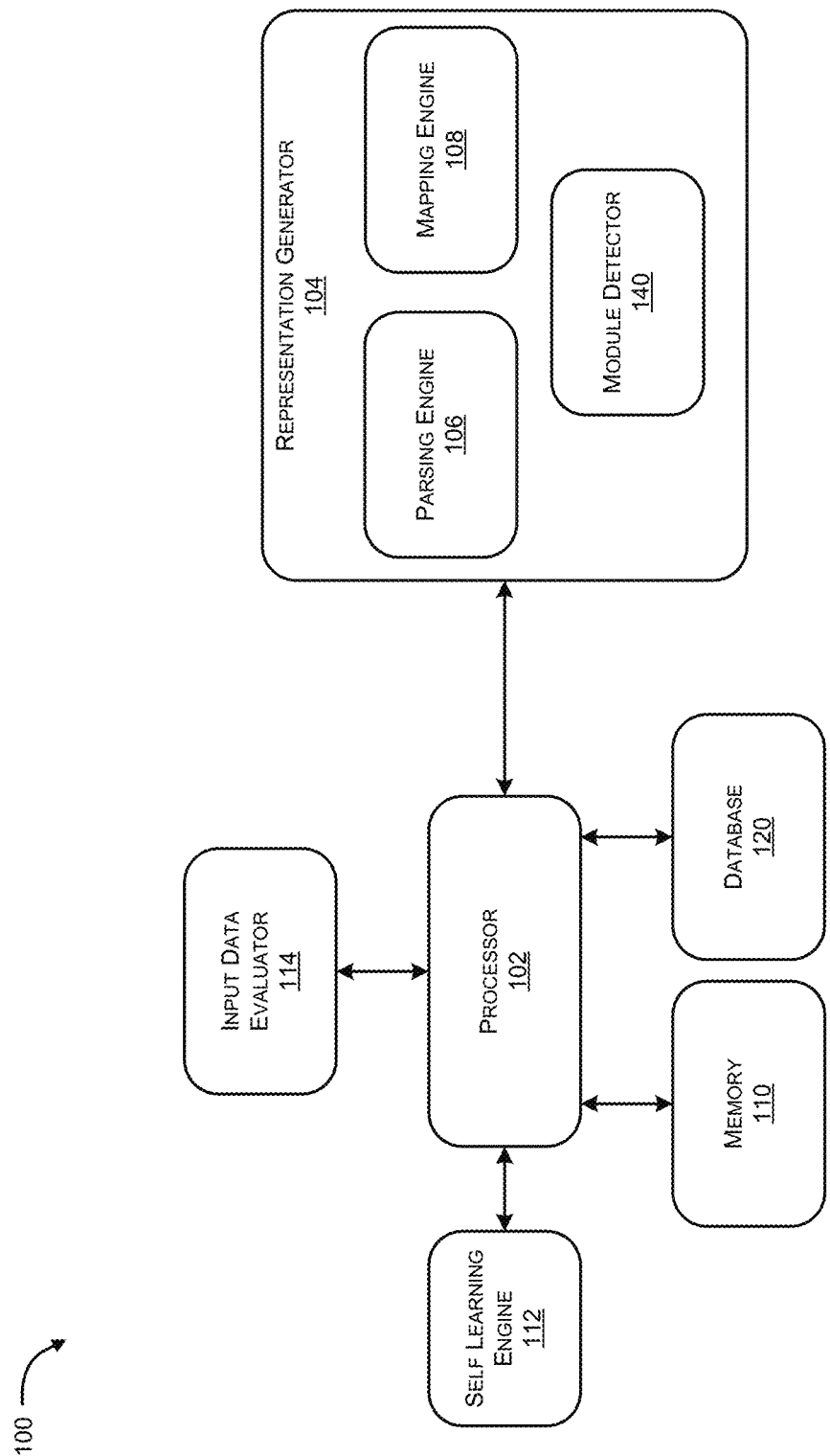
FIG. 1 illustrates a system for generating an output representation, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "a" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

Overview

Various embodiments describe providing a solution in the form of a system and a method for generating an output representation. The system may include a processor. The processor may include a a representation generator. The representation generator may receive an input data comprising an input content and an instruction. The input content may include information to be displayed in an expected representation, and the instruction may correspond to one or more attributes related to the expected representation of the input content. The representation generator include a parsing engine to parse the input data to obtain parsed information. The representation generator may include a mapping engine to map the parsed information with a pre-stored base template pertaining to a pre-defined module, to obtain a mapped template. In an embodiment, the mapping may be performed based on comparative identification of pre-defined portions in the pre-stored base template with respect to the parsed information. The representation generator may generate, through a machine learning (ML) model, based on the mapped template, an output representation in a pre-defined format. In an embodiment, the output representation may be generated by retaining, in the pre-stored base template, the corresponding pre-defined portions that are present in the parsed information. The output representation may correspond to the expected representation of the input content.

In an embodiment, the system may include a self-learning engine implemented via the processor. The self-learning engine may include an artificial intelligence (AI) model to perform the self-learning procedure to obtain the optimized output representation. The self-learning engine may be configured to receive the input data and the output representation. Based on a comparative analysis, the self-learning engine may identify an optimal case pair from the plurality of case pairs in the database. In an embodiment, the comparative analysis may include identification of the optimal case pair based on closest similarity between respective instructions in the input data and the sample input data. The term "case" may refer to an instruction in an input data for obtaining an expected/desired output representation. The term "case pair" may correspond to a combination of the instruction/input data and the corresponding output/optimized representation that may have been generated/optimized based on a previously provided feedback by a user/self-learning engine. The self-learning engine may be configured to receive execute, through the AI model, based on corresponding sample output representation of the optimal case pair, a set of modifications to the output representation to obtain the optimized output representation, and wherein the set of modifications corresponds to the suggested rectification in the annotated feedback pertaining to preceding cycles of feedback-based output generation.

In an embodiment, the system may include an input data evaluator implemented via the processor. The input data evaluator may generate a second file pertaining to the output representation. The input data evaluator may identify a variation in the instruction corresponding to the second file with respect to the instruction in the first file. Based on the identified variation, the input data evaluator may generate a recommendation feedback for optimization of the instruction in the input data. In an embodiment, the system may include a module detector to detect a module from a plurality of pre-defined modules for generating the output representation.

Exemplary embodiments of the present disclosure have been described in the framework for facilitating generation of output representation. The embodiments may describe a system and a method to generate an output representation based on an input data including an input content and an instruction. The automated output representation may enable to reduce manual efforts of mapping the input content with hundreds or thousands of base templates, as per the requirements or the provided instruction. Further, the embodiments may describe a system and a method to generate an optimized output representation though a self-learning procedure. The optimized output representation may be obtained by identification of most suitable case pair (optimal case pair) from an augmented database. The system and a method may also facilitate the set of modifications may pertain to suggested rectification in an annotated feedback pertaining to preceding cycles of feedback-based output generation. Thus, the system may also refer to previously stored annotated feedback so that suggested changes from the feedback may be added automatically to avoid multiple iterations for feedback generation. Further, the embodiments may describe a system and a method to generate recommendation for an input data. The recommendation may facilitate a user to understand points or requirements to prepare an improved form of input data for an upcoming output generation. Furthermore, the embodiments may describe a system and a method to automatically detect a pre-defined module from a plurality of pre-defined modules for generating the output representation through the mapping. This feature may facilitate to minimize time and manual efforts, while ensuring best results. In general, the system and method may enhance efficiency and automation in generating output representation, thus resulting in easy maintenance, cost-savings and reduced time for the associated tasks. The system and method of the present disclosure may be applied to several applications that involve digital marketing in fields, such as, for example, product based company, cosmetics, offered services, luxury goods, banking, insurance, travel, hospitality, health care, and other such fields. However, one of ordinary skill in the art will appreciate that the present disclosure may not be limited to such applications. For example, the system, alone or in integration with other tools, may enable an end user to generate a desired output representation such as, for example, HyperText Markup Language (HTML) based representation. This may be used for creating/updating dynamic online content or templates and/or other such uses. Several other advantages may be realized.

FIG. 1 illustrates a system 100 for generating an output representation, according to an example embodiment of the present disclosure. The system 100 may be implemented by way of a single device or a combination of multiple devices that are operatively connected or networked together. The system 100 may be implemented in hardware or a suitable combination of hardware and software. The system 100 includes a processor 102. The processor may be coupled to at least one database 120 and a memory 110. The memory 110 may store instructions to be executed by the processor 102. The processor 102 may include a representation generator 104, a self-learning engine 112 and an input data evaluator 114 (or input evaluator 114), wherein one or more functions may be implemented by mentioned components via the processor 102.

The system 100 may be a hardware device including the processor 102 executing machine readable program instructions to facilitate generation of an output representation based on an input data from a user. Execution of the machine readable program instructions by the processor 102 may enable the proposed system to facilitate the generation of the output representation. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 102 may include, for example, microprocessors, microcomputers, microcontrollers, digital signal processors, central processing units, state machines, logic circuits, and/or any devices that manipulate data or signals based on operational instructions. Among other capabilities, processor 102 may fetch and execute computer-readable instructions in a memory operationally coupled with system 100 for performing tasks such as data processing, input/output processing, data/object extraction, object identification and/or any other functions. Any reference to a task in the present disclosure may refer to an operation being or that may be performed on data.

The representation generator 104 may include or may be coupled to a parsing engine 106, a mapping engine 108 and a module detector 140. The representation generator 104 may receive an input data (hereinafter interchangeably referred to as input brief). In an embodiment, the input data may include an input content and an instruction. The input content may include information to be displayed in an expected representation. The instruction may correspond to one or more attributes related to the expected representation of the input content. The parsing engine 106 may parse the input data to obtain parsed information. The mapping engine 108 may map the parsed information with a pre-stored base template pertaining to a pre-defined module, to obtain a mapped template. In an embodiment, the mapping may be performed based on comparative identification of pre-defined portions in the pre-stored base template with respect to the parsed information. The representation generator 104 may generate, through a machine learning (ML) model, based on the mapped template, an output representation in a pre-defined format. The output representation may be generated by retaining, in the pre-stored base template, the corresponding pre-defined portions that are present in the parsed information. In an example embodiment, the output representation may correspond to the expected representation of the input content.

In an embodiment, the input data, the corresponding output representation and the pre-defined template may be stored in database 120 coupled to the processor 102. In an example embodiment, the database 120 may be an augmented database including pre-stored plurality of case pairs. The pre-stored plurality of case pairs may be used to refine the output representation through a self-learning procedure to obtain an optimized output representation. For example, each case pair may include a combination of sample input data and a corresponding sample output representation. The corresponding sample output representation may be obtained by preceding cycles of feedback-based output generation. In an embodiment, the feedback may include an annotated feedback including a suggested rectification in the sample output representation with respect to the sample input data.

The self-learning engine 112 may be implemented via the processor 102. The self-learning engine 112 may include an artificial intelligence (AI) model to perform the self-learning procedure to obtain the optimized output representation. In an embodiment, the self-learning engine 112 may be configured to receive the input data and the output representation. Based on a comparative analysis, the self-learning engine 112 may identify an optimal case pair from the plurality of case pairs in the database. In an embodiment, the optimal case pair may be identified based on closest similarity between respective instructions in the input data and the sample input data. Based on corresponding sample output representation of the optimal case pair, the self-learning engine 112 may execute a set of modifications to the output representation to obtain the optimized output representation. The set of modifications may be executed through the AI model. In an example embodiment, the set of modifications may correspond to the suggested rectification in the annotated feedback pertaining to preceding cycles of feedback-based output generation. In an embodiment, the input data evaluator 114 may be implemented via the processor 102. The input data evaluator 114 may generate a recommendation feedback for optimization of the instruction in the input data. In an embodiment, the module detector 140 may detect a module from a plurality of pre-defined modules for generating the output representation through the mapping.

Figure 2:
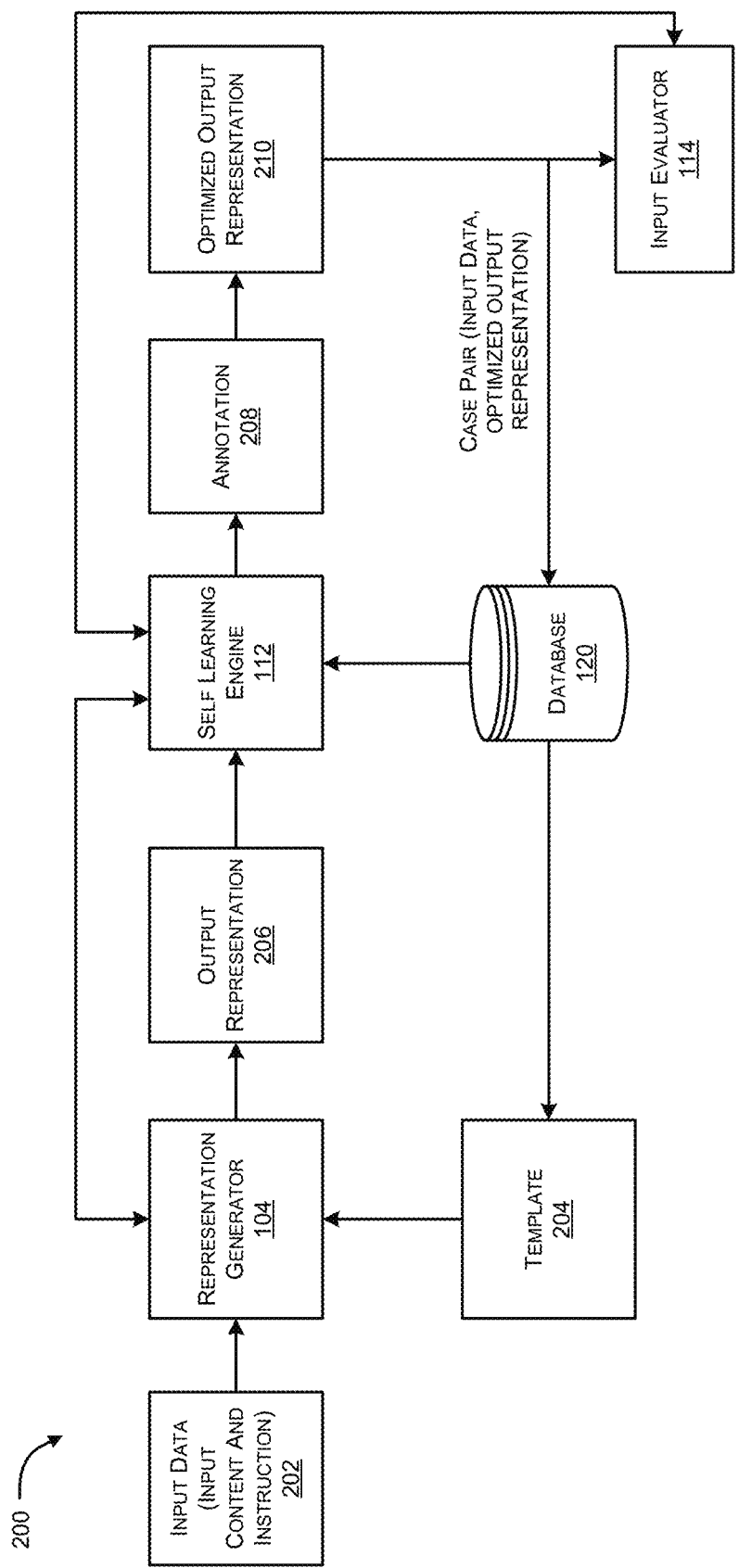
FIG. 2 illustrates an exemplary block diagram representation for key steps involved in generation of an output representation, according to an example embodiment of the present disclosure.

FIG. 2 illustrates an exemplary block diagram representation 200 for key steps involved in generation of an output representation, according to an example embodiment of the present disclosure. As illustrated in FIG. 2, an input data 202 may be provided to the representation generator 104 of the processor. In an example embodiment, the input data may be provided by a user and may include an input content and an instruction. The input content may include information to be displayed in an expected representation. For example, the input data may include the input content in the form of a plurality of data elements. The data elements may include, for example, at least one of images, headers, uniform resource locator (URL) link, fonts, styles, tables, graphs, paragraphs, sections, references, footers, video link or signatures. It may be appreciated that the mentioned data elements are exemplary and various other data elements may also be used. The instruction may correspond to one or more attributes related to the expected representation of the input content. For example, the instruction may convey commands or requirements as per a final representation expected by user. In an example embodiment, the instruction in the input data may pertain to at least one of a graphical instruction, a textual instruction, a strike-through instruction, an annotated instruction and a referencing instruction. For example, a graphical instruction may include a graphical illustration, for example, an instruction mentioning to add/replace a URL link or an image type/orientation. The textual instruction may include a textual message mentioning one or more details to be added/replaced. The strike-through instruction may include an instruction indicating a deleted portion or a particular portion that requires deletion in a strike-through format. The annotated instruction may include a highlighted portion or comments that may be of key importance. For example, in an annotated instruction, a particular text may be required in a bold format and hence the instruction pertaining to the text may be highlighted in a specific color. The referencing instruction may pertain to one or more references such as, for example, URL links, images and other information that may provide access to an externally available information.

The various possible instructions in the input data may be complex to interpret and may be explicit/implicit in nature, thereby leading to one or more challenges in interpreting the instructions. For example, in case of graphical instruction, extraction of graphical symbols and association of the symbols with corresponding text may be challenging. In an embodiment, this may require advanced image processing algorithms such as object detection to detect predefined set of symbols and then matching with relevant instruction segments. In another example, to detect and extract strike-through instructions, advanced image processing algorithms like image segmentation and OCR conversion algorithms may be applied. In case of annotated instructions, such as, for example, highlighted comments, a combination of image processing/segmentation and text interpretation algorithms may be implemented to enable segmenting and extracting textual segments for later interpretation. Similarly, referencing instructions may be present in the form of numerical, roman, alphabet indices such that the corresponding instructions may be specified at different segments. In an embodiment, this may require detection and extraction of indices and corresponding instruction portions, wherein index detection algorithms in addition to the text segmentation algorithms may be applied.

Figure 3:
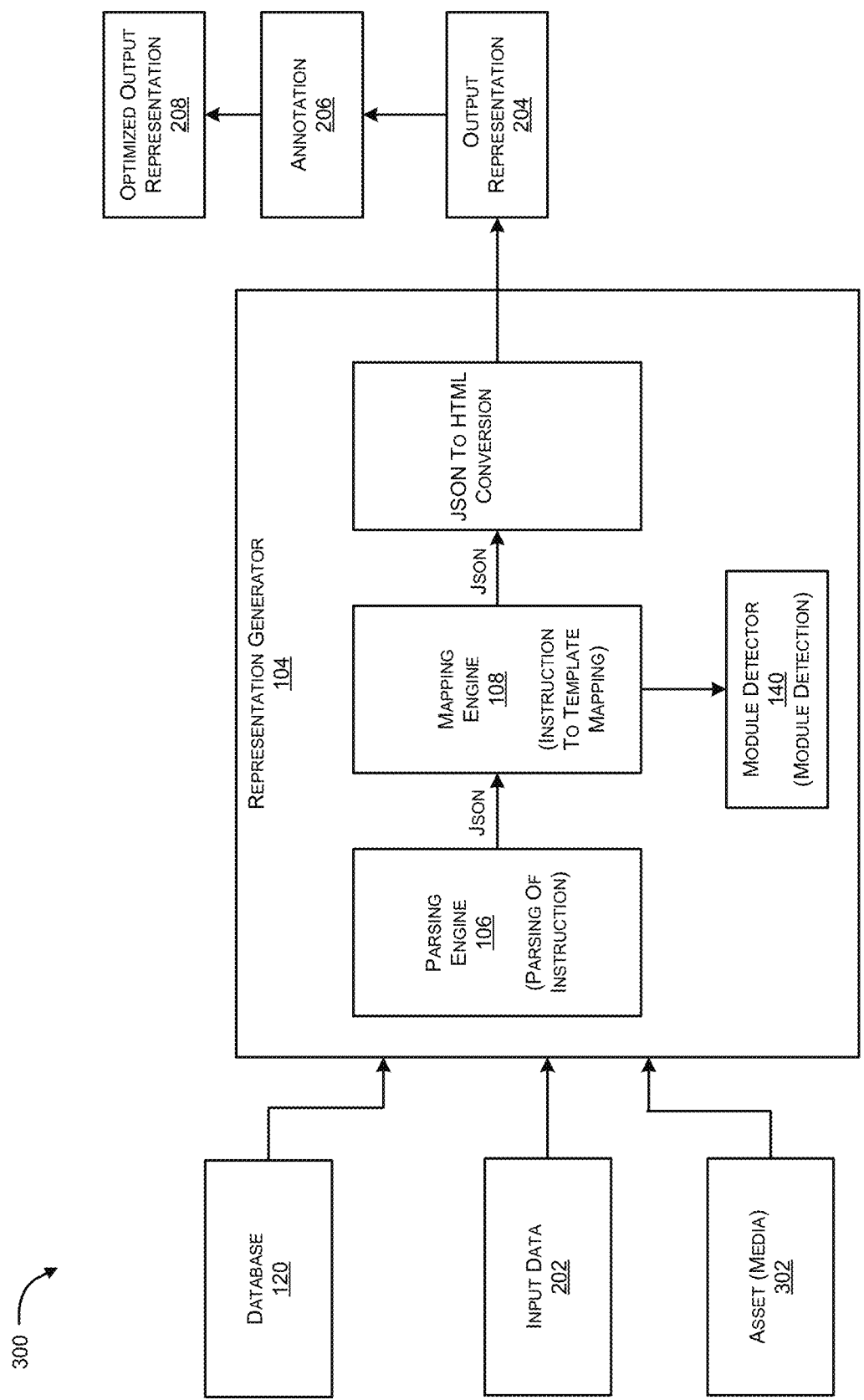
FIG. 3 illustrates an exemplary block diagram representation for steps or functions executed by representation generator, according to an example embodiment of the present disclosure.

As illustrated in FIG. 2, the representation generator 104 may generate an output representation 206 in a pre-defined format, wherein the stages involved in the generation of the output representation is shown in FIG. 3. FIG. 3 illustrates an exemplary block diagram representation 300 for steps or functions executed by representation generator 104, according to an example embodiment of the present disclosure. As illustrated in FIG. 3, input data 202 may be received by the representation generator 104. In an embodiment, the representation generator 104 may also receive asset (or media) files 302 from database 120 or an external database. In an example embodiment, the asset or media files may include image data (such as in png, jpeg, gif file format) and/or video data that may be required to be included or embedded in the output representation. Upon receipt of the input data 202, the parsing engine 106 may parse the input data to obtain parsed information. In an embodiment, the parsing engine 106 may generate the parsed information based on identification of a corresponding section in the input data that stores the instruction. As the input data may be in form of a brief that may include input content and instruction, this step may enable to access the instruction part of the input data.

Based on the identification, the parsing engine 106 may perform classification of the identified section to process the one or more attributes pertaining to the instruction. For examples, the classification may enable to distinguish between two different types or sub-types of instruction and its corresponding attributes, such as, for example, classification into email based data and non-email data and other such classification. These attributes may pertain to one or more aspects of the instruction that may enable to understand the output representation as expected by the user. For example, the attributes may pertain to position, sequence or orientation of one or more images, text and other objects in the input content. In another example, the attributes may also pertain to formatting requirements of the images, text and other objects in the input content. Various other attributes may be processed to understand the instruction based on the classification. In an example embodiment, the parsed information may be stored as a first file including a JavaScript Object Notation (JSON) format. The embodiment described herein may not be restricted by the mentioned file format and the parsed information may be stored in various types of formats.

Upon receiving the parsed information, the mapping engine 108 may map the parsed information with a pre-stored base template to obtain a mapped template. The mapping may be performed based on comparative identification of pre-defined portions in the pre-stored base template with respect to the parsed information. The mapping engine 108 may map the instruction in the parsed information (derived from input data) to the template. In an example embodiment, the base template (shown as 204 in FIG. 2) may be stored in the database 120. FIG. 4 illustrates an exemplary block diagram representation 400 showing a summary of data elements pertaining to pre-stored base templates, according to an example embodiment of the present disclosure. As shown in FIG. 4, the database may store different pre-stored base templates such as, for example, templates A-F. The various templates may include different sections including one or more data elements that may be represented in different formats of representation. Similar to the data elements in the input data, the data elements pertaining to various sections in the pre-stored base template may include at least one of images, headers, uniform resource locator (URL) link, fonts, styles, tables, graphs, paragraphs, sections, references, footers, video link or signatures. The sections, corresponding data elements and/or the format may change based on the template. For example, the template A does not include a tagline but the template E includes a tagline. In another example, template F may include 3 images in a row (3UP images) but the template B may not include the same. Various other different templates may be stored in the database.

In an embodiment, the pre-stored base templates may be categorized or combined based on the similarity in the data elements and the type of representation. In an embodiment, the processor may enable to identify the most suitable template/format based on characteristics of the input data. In an example embodiment, the base template (shown as 204 in FIG. 2) may pertain to a pre-defined module. Referring to FIG. 3, the module detector 140 may detect the pre-defined module from a plurality of pre-defined modules. In an example embodiment, the pre-defined module may be detected, using a library, based on similarity of extracted features corresponding to the mapped template and the input content of the input data. The mapping step or detection of pre-defined module may also consider client specific guidelines as provided by an entity or user. Referring to FIGS. 2 and 3, and in an embodiment, the representation generator 104 may generate, through a machine learning (ML) model, based on the mapped template, an output representation 206 in a pre-defined format. The output representation 206 may correspond to the expected representation of the input content and the pre-defined format of the output representation may include at least one of a hypertext markup language (HTML) format or a pdf format. Various other formats may also be possible. In an example embodiment and as shown in FIG. 2 and FIG. 3, the output representation 206 may be subjected to annotation 206 to obtain an optimized output representation 210. In an embodiment, the annotation may be automated. In an alternate embodiment, the annotation may be partly manual and partly automated. The annotation may be a type of feedback that may indicate one or more aspects to be corrected/added/deleted in the output representation to align with the expected output representation. In an example embodiment, the input data 202 and the corresponding output representation (or optimized output representation 210) may be stored in the database 120 coupled to the processor.

In an example embodiment and referring to FIG. 2, the optimized output representation may be obtained through a self-learning engine 112 implemented via the processor. The self-learning engine 112 may include an artificial intelligence (AI) model to perform a self-learning procedure. In an embodiment, the self-learning engine 112, in association with the representation generator 104 (that generates the output representation) may facilitate the generation of the optimized output representation. In an example embodiment, the self-learning engine 112 may be configured to receive the input data and the output representation. Based on a comparative analysis, the self-learning engine 112 may identify an optimal case pair from the plurality of case pairs in the database 120. The comparative analysis may be performed by identification of optimal case pair based on closest similarity between respective instructions in the input data and the sample input data. In an example embodiment, the comparative analysis may be performed by a feature vector based estimation of similarity metrics. For example, the similarity metrics include at least one of a cosine similarity or euclidean distance. Further, the self-learning engine 112 may execute, through the AI model, based on corresponding sample output representation of the optimal case pair, a set of modifications to the output representation to obtain the optimized output representation. In an example embodiment, the set of modifications may correspond to the suggested rectification in the annotated feedback pertaining to preceding cycles of feedback-based output generation. For example, the optimal case pair may include previously stored annotation based feedback suggesting addition, deletion and/or modification of a certain section/data element, such as, for example, change in font style/type, which may be annotated, for example by using a colour highlight, comments and other such annotation techniques. The self-learning engine 112 may refer to the previously stored annotation based feedback to avoid multiple iterations of manual feedback. This may save a lot of time and efforts of the user, wherein the self-learning procedure may keep improving with more number of case pairs stored after each optimization cycle.

Further, as shown in FIG. 2, the system may also enable to improvise the input data for future cycles by providing recommendation by input data evaluator 114. In an embodiment, the input data evaluator 114 may be associated with the self-learning engine 112 to facilitate standardization of the input data to enable finding the potential gap/improvements required in the input data. In an example embodiment, the input data evaluator 114 may refer to parsed information (pertaining to input data) that is stored as a first file in a JSON format. The input data evaluator 114 may further generate a second file pertaining to the output representation, wherein the second file may also include a JSON format. The input data evaluator 114 may identify a variation in the instruction corresponding to the second file with respect to the instruction in the first file. Based on the identified variation, the input evaluator 114 may provide a recommendation feedback for optimization of the instruction in the input data. For example, the recommendation feedback may be able to identify what type of instruction should have been included in the input data. This may facilitate to assist the user to prepare improved input data files, while preventing potential errors/mistakes in the input data in upcoming generation cycles.

Figure 5A:
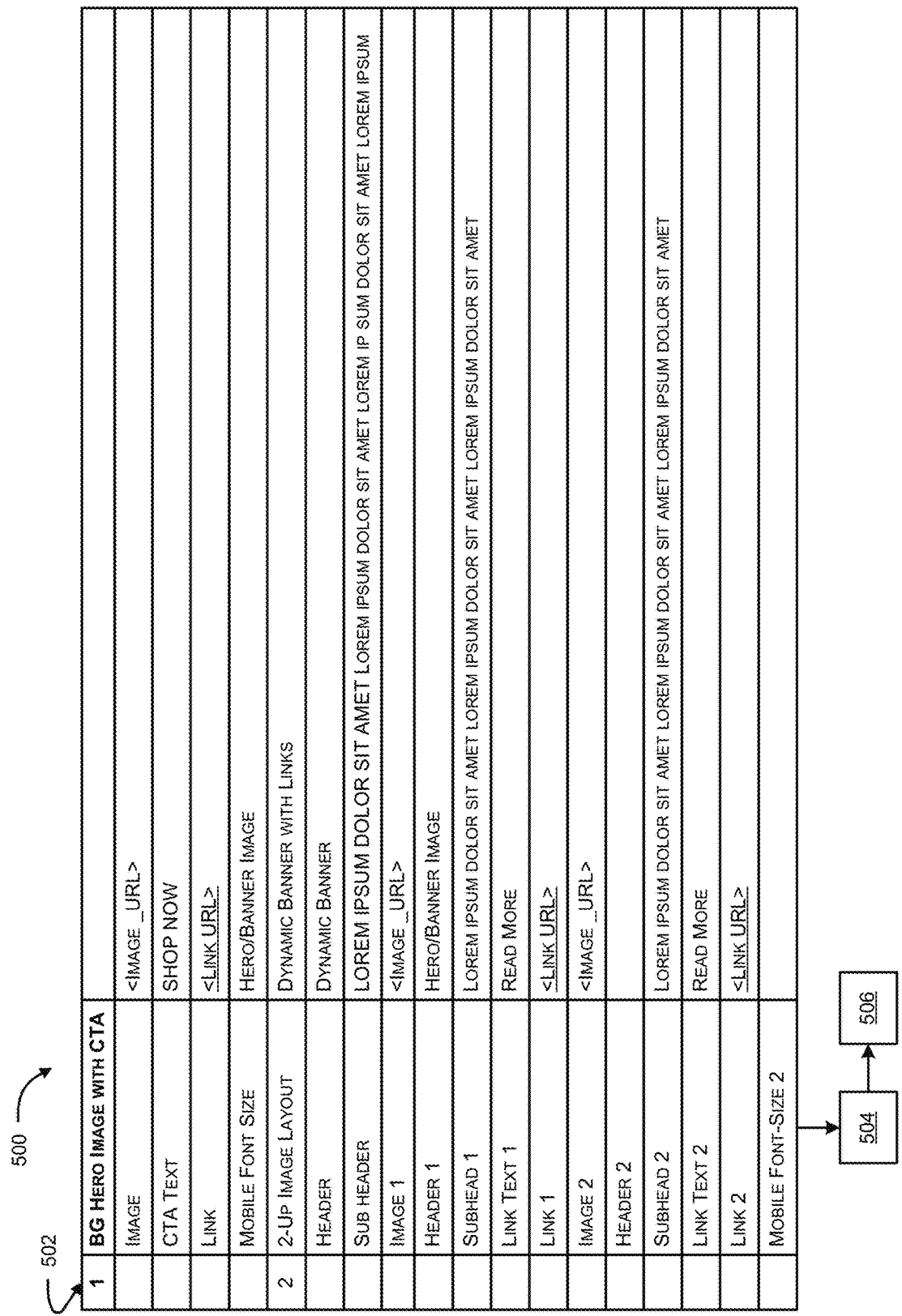
Figure 6A:
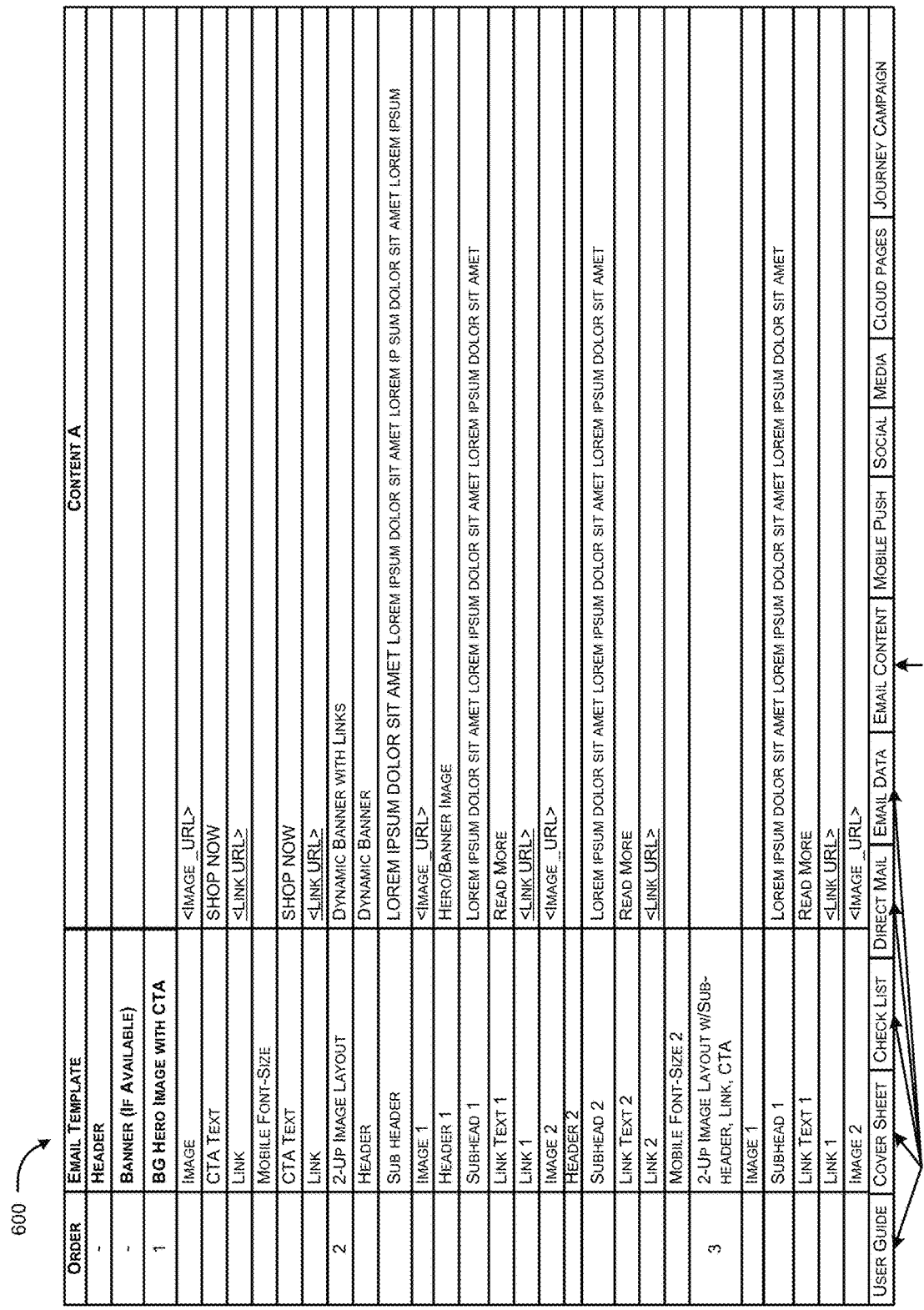
FIGS. 6A-6B illustrate exemplary representations showing classification of identified sections in an input data, according to an example embodiment of the present disclosure.
Figure 6B:
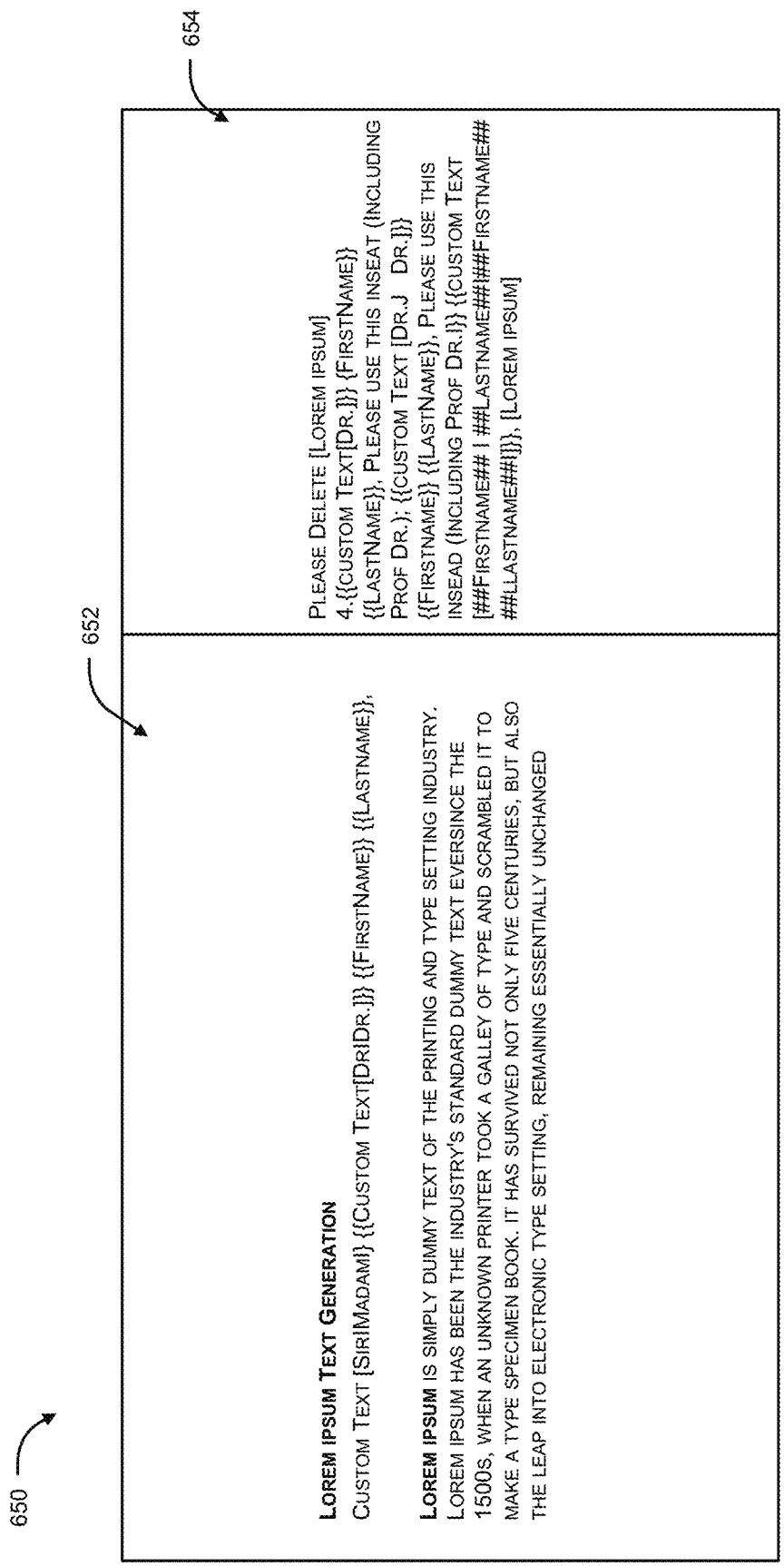

FIGS. 5A-5B illustrate an exemplary representation 500 pertaining to generated output representation and, according to an example embodiment of the present disclosure. As shown in 500 in FIG. 5A, an input data (or an input brief) 502 may be include an input content and instruction pertaining to an expected output representation. The input content may pertain to various data elements such as, image, text, link and other such details, and instruction may pertain to the type of font size, type of headers, sub-headers and links, sequence in which input content may appear and other such details. For example, as shown in FIG. 5A, a first section may be "BG Hero Image section" including data elements or fields such as image, text, link, mobile font size, wherein a second section may pertain to a 2-UP image layout (for example, including 2 images in a row). In an example embodiment, the input data may include an excel sheet or a pdf file format. In an embodiment, and as explained in previous sections, the input data may be parsed by parsing engine to obtain a parsed information. The parsing engine may generate the parsed information based on identification of a corresponding section in the input data that stores the instruction and the input content. The identified section may be classified to obtain the parsed information. FIGS. 6A-6B illustrate exemplary representations 600 and 650 respectively, showing classification of identified section in the input data, according to an example embodiment of the present disclosure. As shown in FIG. 6A, the parsing engine may parse the input data based on classification of the input content/instruction in the input data. For example, as observed in 600, each tab of excel sheet based input data (or each paragraph of the pdf file) may be classified based on the contents into an email content data 604 or non-email content data 602. Similarly in FIG. 6B, the input data 650 may be parsed based on classification into instructions 654 or non-instructions 652. The classification may enable to segregate the input content and/or instructions into separate categories based on various types of input data and/or different criteria or requirements of the expected output representation. In an embodiment, the classification may be performed by Term Frequency-Inverse Document Frequency (TF-IDF) vector based technique. In an example embodiment, the TF-IDF vector based technique may enable to understand importance of content or instruction by assessing corresponding weighting factor pertaining to a text/data pertaining to input content/instruction based on various factors. For example, in this technique, the factor may pertain to frequency of occurrence such that the TF-IDF vector value may proportionally increase based on number of times a text/term may appear. The classification may enable to obtain the parsed information that may be effective to map with the base template than direct mapping of the input data.

Figure 7A:
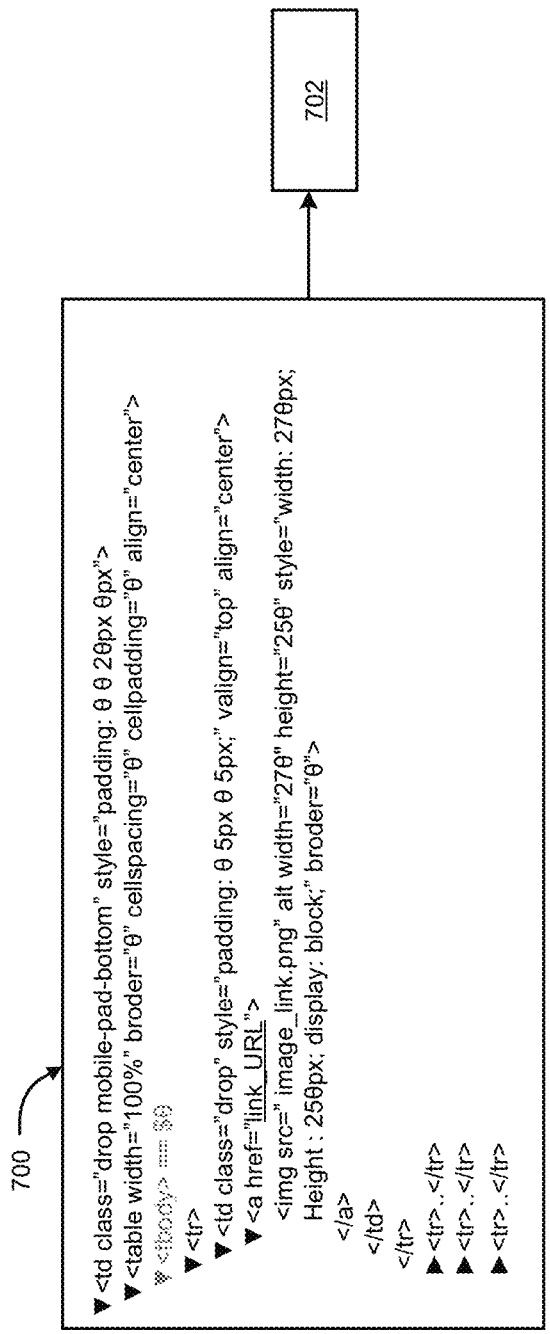

In an example embodiment, the parsed information may be stored as a first file. As shown in 504 (in FIG. 5B), and as per an example embodiment, the parsed information may be stored in JSON format. For the purpose of mapping (by the mapping engine), the first file or JSON file may be used. In an embodiment, the mapping engine may refer to the first file and may identify corresponding section in pre-stored base template to enable mapping of values in the first file with corresponding codes (such as HTML codes) of the section in the base template. In this embodiment, the sections in the base template that may not be present in the first file may be removed from the base template, while retaining the sections and corresponding order as provided in the first file (derived from input data). FIGS. 7A-7B illustrate exemplary representations 700 and 702 respectively, showing replacement of features in a template with input content, according to an example embodiment of the present disclosure. As shown in FIGS. 7A and 7B, 700 may pertain to a JSON file pertaining to a base template and 702 may pertain to a JSON file pertaining to a mapped template/output file pertaining to the mapped template. The mapped template may be obtained by replacing the corresponding features/values in the JSON file 700 with corresponding features/values of the input content based on the library. The output representation may be generated by the ML model by retaining, in the pre-stored base template, the corresponding pre-defined portions that are present in the parsed information. In an embodiment, a detected module pertaining to the ML model may facilitate a replacement of one or more features or codes in the mapped template with the input content of the input data, based on a library, as shown in FIGS. 7A-7B. In an embodiment, the library may include a software language library, for example, Beautiful Soup, which may be generally used to create a parse tree from page source code that can be used to extract data in a hierarchical and more readable manner. Based on the replacement, the output representation may be generated in a desired file format, for example, HTML file, as shown in 506 in FIG. 5B. As observed in FIG. 5B, the output representation may be in HTML format including a representation of the input content based on the instruction in the input data, which may correspond to the expected output representation. It may be appreciated that the mentioned file types or formats pertaining to parsed information, input data and/or output representation may be exemplary and various other file types may be possibly utilized.

Figure 8:
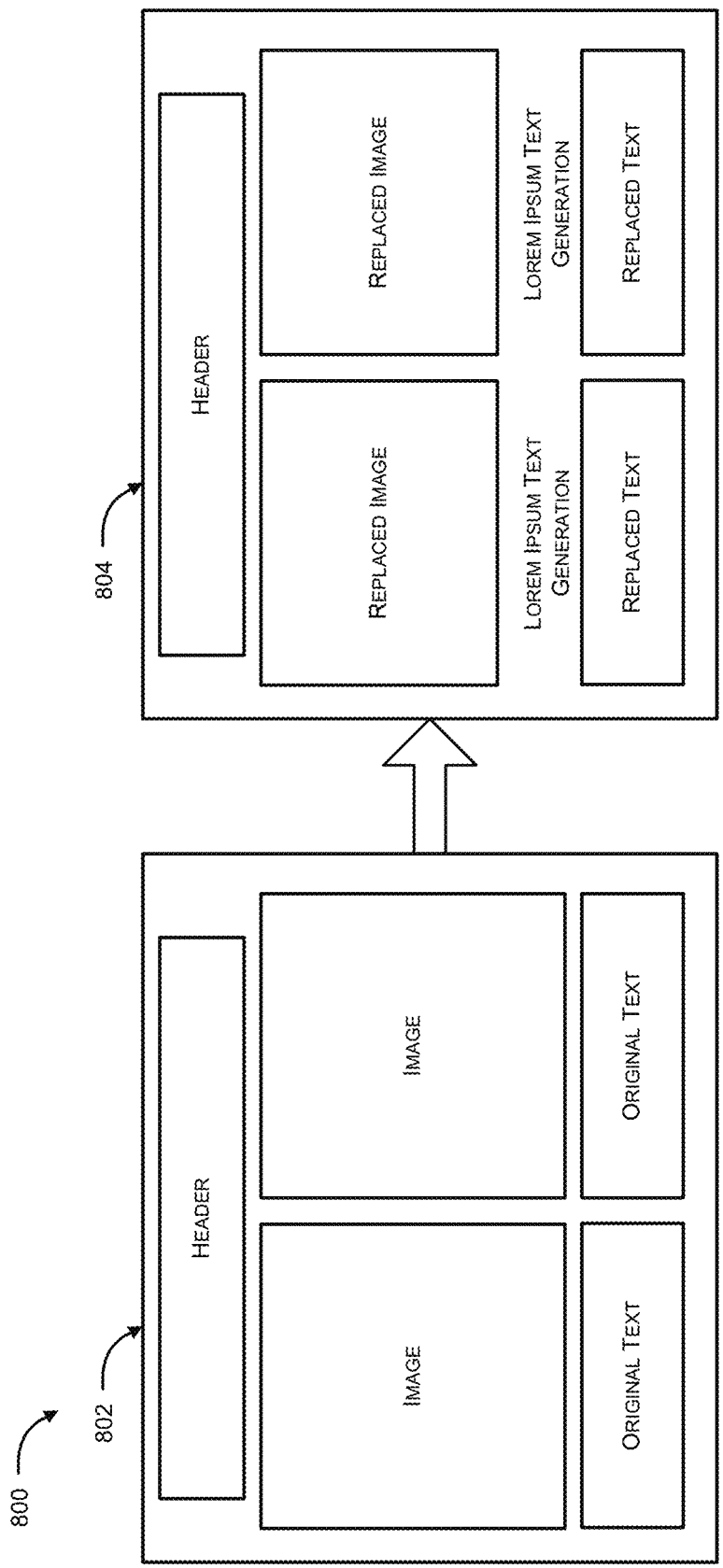
FIG. 8 illustrates an exemplary representation showing replacement of data elements in a HTML file format, according to an example embodiment of the present disclosure.

FIG. 8 illustrate an exemplary representation 800 showing replacement of data elements in a HTML file format, according to an example embodiment of the present disclosure. As shown in FIG. 8, 802 shows a HTML file pertaining to a base template and 804 shows a HTML file pertaining to an output representation. It may be observed that original text and images in base template 802 are replaced by text and images as shown in 804, wherein the replacement corresponds to a replacement in the features or codes as shown in JSON files 701 and 702 respectively in FIGS. 7A-7B. As explained earlier, once the output representation may be generated, the self-learning engine may implement a self-learning procedure to obtain an optimized output representation (as shown in FIG. 2). In an embodiment, the AI model of the self-learning engine may enable to identify the optimal case pair from the plurality of case pairs in the database for implementing the self-learning procedure.

In an example embodiment, the optimal case pair may be obtained by comparative analysis that may include identification of the optimal case pair based on closest similarity between respective instructions in the input data and the sample input data. For example, the comparative analysis may be performed by feature vector based estimation of similarity metrics. FIGS. 9A-9B illustrate exemplary representations 900 and 950 respectively, showing feature vector based estimation of similarity metrics, according to an example embodiment of the present disclosure. Assuming that 900 may be an input data, the feature vector based estimation may assign a vector value for each section/field. For example, the section "BG Hero Image with CTA" includes the fields such as, for example, image, CTA Text, link, mobile font size. Thus, the feature vector for this section may pertain to the features, such as, for example, 1. BG_Hero_Image_Image,
2. BG_Hero_Image_CTA_Text,
3. BG_Hero_Image_Link,
4. BG_Hero_Image_Mobile_Font_Size,
5. 2up_Image_Layout_Header,
6. 2up_Image_Layout_Subheader,
7. 2up_Image_Layout_Image1,
8. 2up_Image_Layout_Header1,
9. 2up_Image_Layout_Subhead1,
10. 2up_Image_Layout_Linktext1,
11. 2up_Image_Layout_Link1,
12. 2up_Image_Layout_Image2,
13. 2up_Image_Layout_Header2,
14. 2up_Image_Layout_Subhead2,
15. 2up_Image_Layout_Linktext2, 16. 2up_Image_Layout_Link2, 17. 2up_Image_Layout_Mobile_Font_Size As shown hereinabove, the feature vector pertaining to each feature may be illustrated as a feature vector value as shown in 904 as (1,1,1,0,1,1,2,2,2,2,2,2,2,2,2,2,0). In this each value may pertain to information of the feature as provided in the input data. For example, the feature "BG_Hero_Image_Mobile_Font_Size" is blank in the input data 902 and hence the feature vector is shown as 0. Similarly, other vector values may also be computed, wherein the feature vector value may be computed for all the sections/fields/features. Further, as shown in FIG. 9B, the representation 950 may pertain to a sample input data 952 pertaining to a case pair from the pre-stored plurality of case pairs stored in the database (augmented database). The sample input data 952 may include feature vector for corresponding section "BG Hero Image with CTA" as (1,1,1,0,1,1,2,2,1,2, 2.2,2,1,2,2,0), as shown in 954, wherein the feature vector value may be computed for all the sections/fields/features. The AI model of the self-learning engine may facilitate computation of a similarity score by performing comparative analysis based on feature vector based estimation of similarity metrics. In an example, the similarity metrics may include at least one of a cosine similarity or euclidean distance. For example, based on the metrics pertaining to cosine similarity, a similarity score of 0.978 may be obtained for the input data 902 and the sample input data 952. In this case, as the similarity score is high, so the final output representation (optimized output representation may be obtained through the self-learning procedure as described earlier, and based on the corresponding sample output representation in the case pair pertaining to sample input data 954 of FIG. 9B. This means that the case pair pertaining to sample input data 954 may be considered as the optimal case pair for the self-learning procedure. In an example embodiment, a pre-defined threshold may be set for assessing the minimum similarity score required for selecting an optimal case pair. For example, the pre-defined threshold may be 0.75. It may be appreciated that the pre-defined threshold is exemplary and may change based on the technique of assessment or domain pertaining to the output representation and hence may not be limited by mentioned range or examples.

Figure 10:
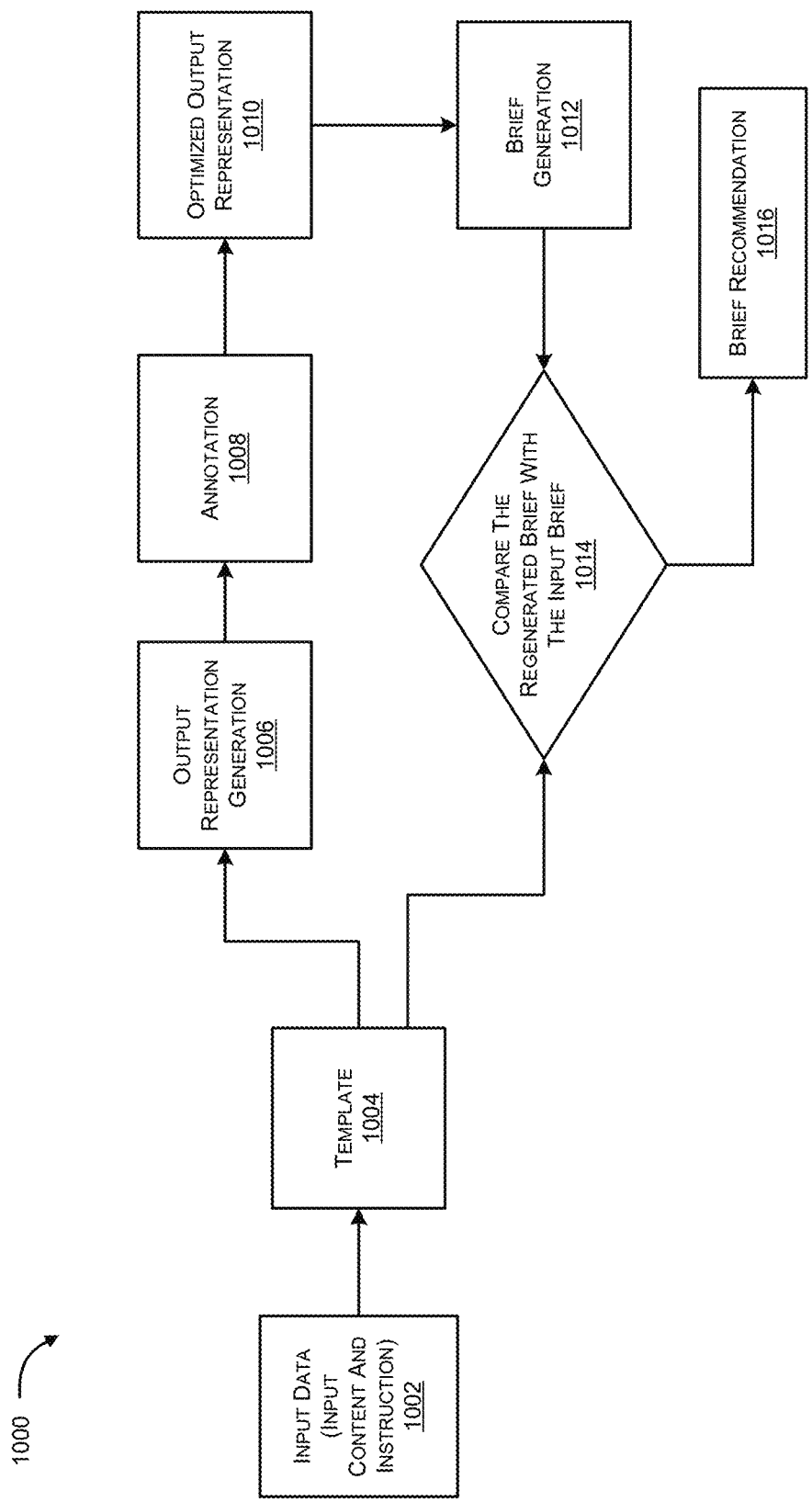
FIG. 10 illustrates an exemplary representation showing steps involved in generation of a recommendation feedback by an input data evaluator, according to an example embodiment of the present disclosure.

In an embodiment, and as mentioned earlier, the input data evaluator (114 of FIG. 2) may generate a recommendation feedback for optimization of the instruction in the input data. FIG. 10 illustrates an exemplary representation 1000 showing steps involved in generation of a recommendation feedback by input data evaluator 114, according to an example embodiment of the present disclosure. As shown in FIG. 10, and as explained in previous embodiments, based on an input data 1002 and a base template 1004, the system may generate an output representation 1006. This may be subjected to annotation to obtain an optimized output representation 1010, for example in an HTML format. Based on the optimized output representation 1010, the input data evaluator may generate a second file (shown as brief generation 1012) pertaining to the optimized output representation. In an example, the second file (also referred hereinafter as "regenerated brief") may be in JSON format. The input data evaluator may also retrieve first file (for example, parsed information stored as JSON format) pertaining to the input data 1002. At 1014, the input data evaluator may compare the second file with the first file i.e. comparison of the regenerated brief with the input brief to provide a recommendation feedback at 1016, as shown in FIG. 10. The comparison of the first file and the second file for generation of the recommendation feedback may be as further depicted n FIGS. 11A-11B.

Figure 11A:
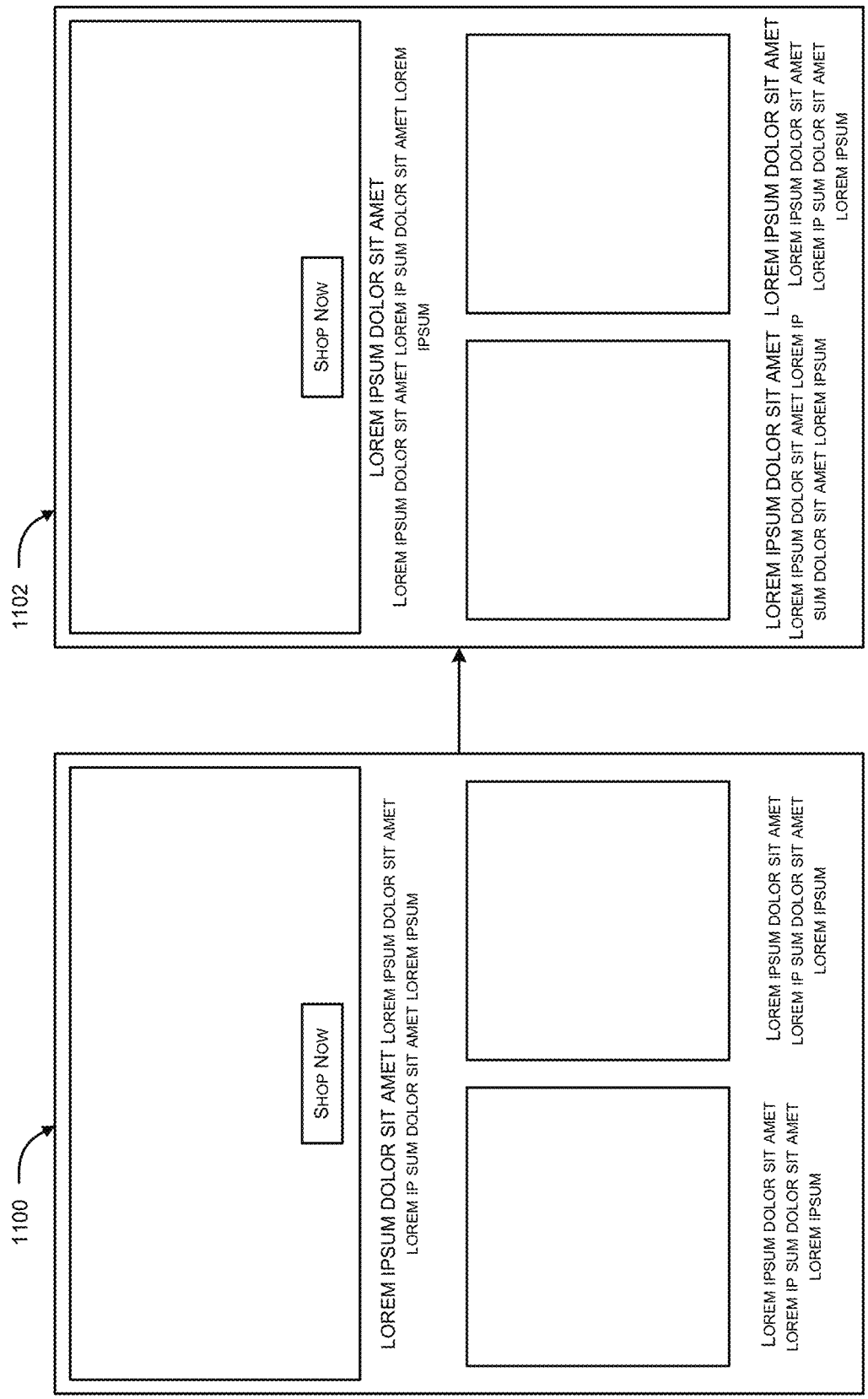
FIG. 11A illustrates exemplary HTML representations for output representation and optimized output representation respectively, according to an example embodiment of the present disclosure.
Figure 11B:
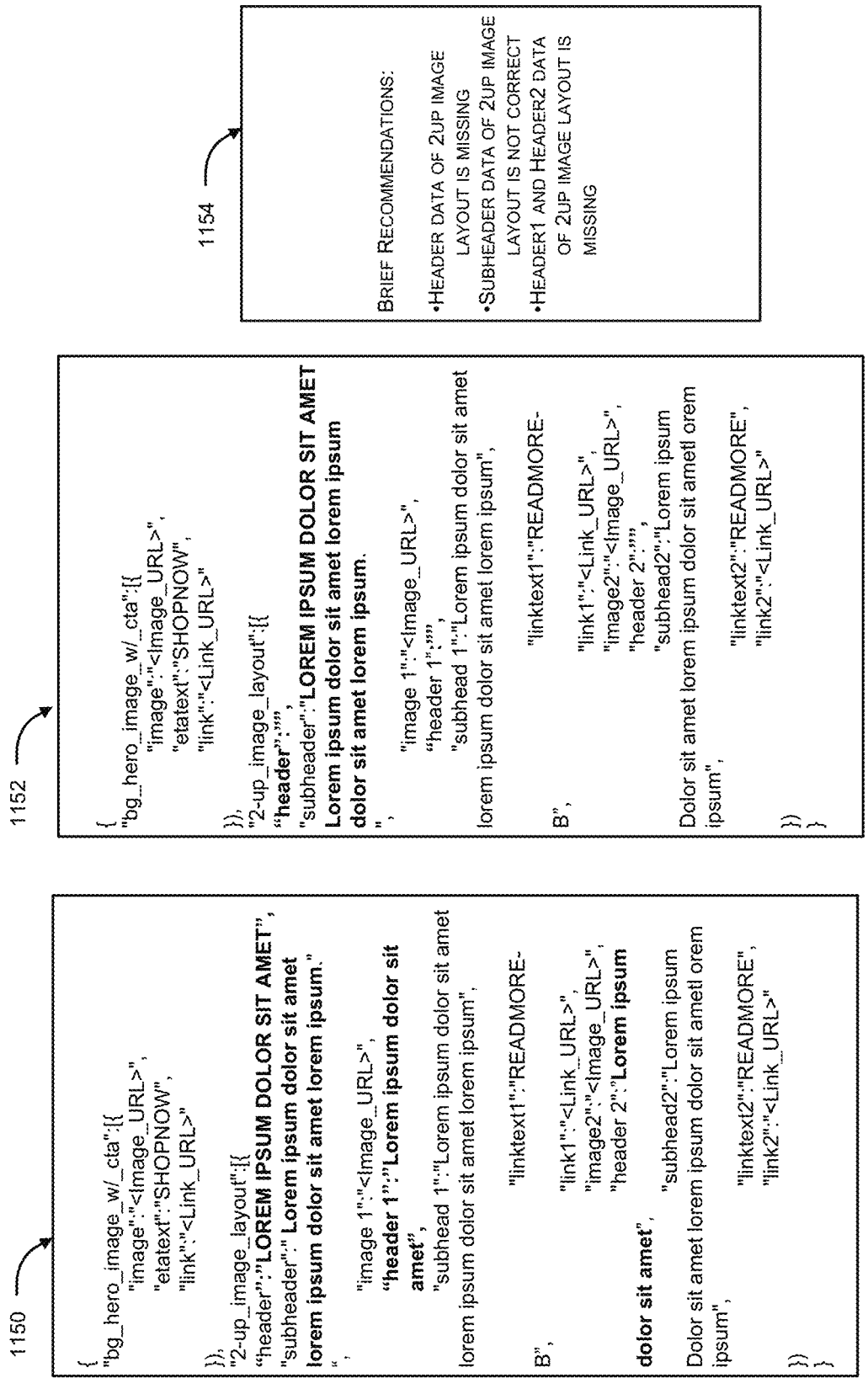
FIG. 11B illustrates exemplary JSON representations for a regenerated brief (second file), an input brief (first file) and a recommendation feedback, according to an example embodiment of the present disclosure.

FIG. 11A illustrate exemplary HTML representations 1100 and 1102 for output representation and optimized output representation respectively, according to an example embodiment of the present disclosure. As shown in FIG. 11A, after the annotation step, the optimized output representation 1102 is obtained from the output representation 1100. The optimized output representation may be modified based on the self-learning procedure/annotation, wherein the optimized output representation 1102 may be obtained after applying a set of modifications to the output representation. In an example embodiment, the set of modifications may correspond to suggested rectification in the annotated feedback pertaining to preceding cycles of feedback-based output generation. In some cases, it may happen that the need for applying the set of modifications may be due to some missing input content and/or lack of appropriate instructions in the input data, as provided by the user. The input data evaluator may mainly attempt to identify these missing/erroneous aspects in the input data by providing a recommendation feedback. FIG. 11B illustrate exemplary JSON representations for regenerated brief (second file) 1150, input brief (first file) 1152 and recommendation feedback 1154, according to an example embodiment of the present disclosure. As shown in FIG. 11B, the regenerated brief (second file) 1150 and the input brief (first file) 1152 may be compared to identify a variation in the instruction corresponding to the second file 1150 with respect to the instruction in the first file 1152. In FIG. 11B, the identified variation may be as depicted in the grey coloured highlighted portion in 1150 and 1152. For example, the header data of 2up image layout that is present in regenerated brief 1150 may be missing in the original brief i.e. the input brief 1152. Similar other missing aspects may be identified to provide recommendation feedback 1154 to enable optimization of the instruction in the input data for future cycle of usage. In an embodiment, the recommendation feedback 1154 may be directly sent to the user or may be stored in the database for preparation of other input data or brief.

Figure 12:
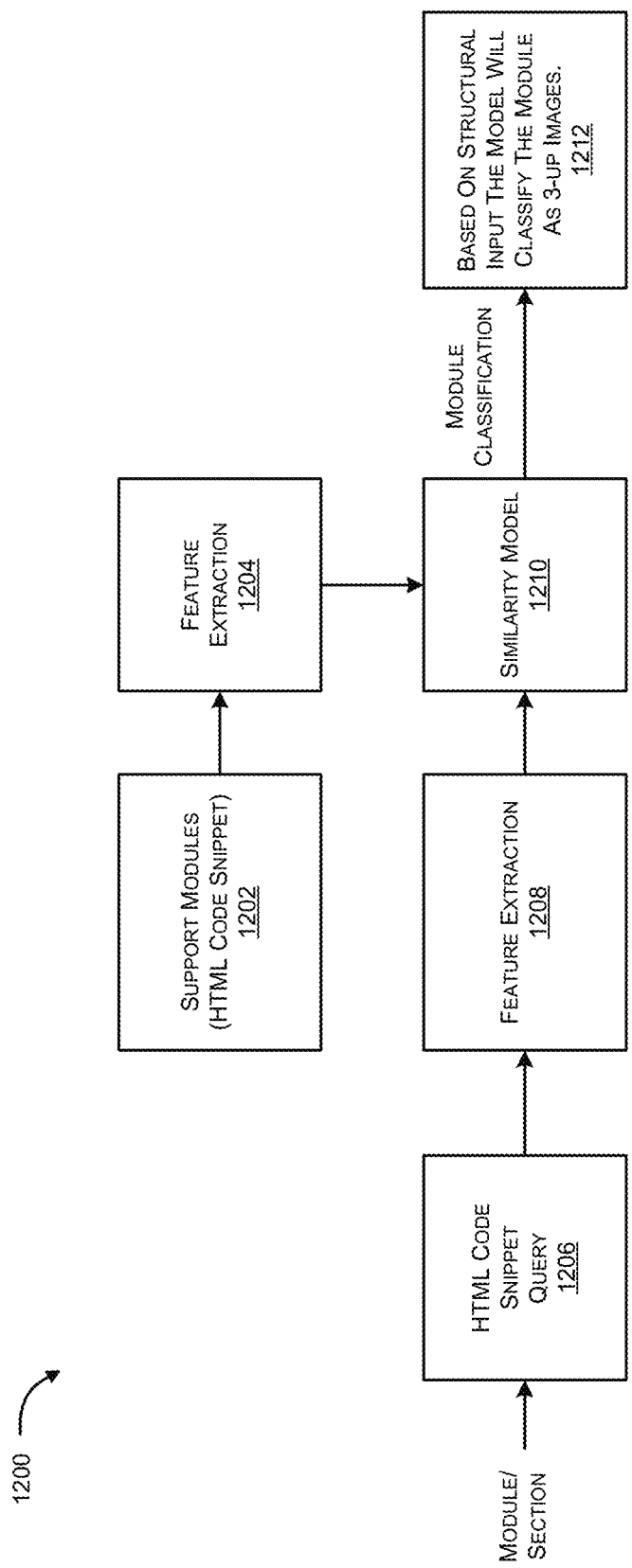
FIG. 12 illustrates an exemplary block diagram representation showing module detection, according to an example embodiment of the present disclosure.

In reference to FIG. 3, the module detector 140 may detect a module from a plurality of pre-defined modules for generating the output representation via mapping. The base template used for mapping may pertain to the module. The module may be detected, using a library, based on similarity of extracted features corresponding to the mapped template and the input content of the input data. For example, the module includes at least one of a classification model or a similarity model. As explained in previous embodiments, the detected module, using the library, may facilitate replacement of one or more features in the mapped template with the input content of the input data. FIG. 12 illustrates an exemplary block diagram representation 1200 showing module detection, according to an example embodiment of the present disclosure. As shown in FIG. 12, at 1202, the processor (or the module detector 140 as shown in FIG. 1) may collect domain specific data by extracting features of a section structure of output representation or HTML files in the database, wherein codes pertaining to the HTML files may be accessible as support modules/support data. The module detector may utilize one of the sections of the support data as a query data as shown in 1206. Further, the module detector may extract features pertaining to the support data at 1204, and the features of the query data may be extracted at 1208. The module detector may use a trained model 1210 such as a similarity model, for identifying similarity between the support data and query data i.e. the extracted features 1204 and 1208 respectively. The support data may contain multiple sections against which the query data i.e. one section is compared. Based on the comparison, the model pertaining to the model detector may classify corresponding module to be 3UP image 1212 i.e. including 3 images in a row. In an example embodiment, the model pertaining to the model detector may be trained by choosing a generic model with almost similar sections structure with target as 1 and with different sections structure with target as 0. The model may be retained till good accuracy may be achieved, wherein the training data used may be generic data and may not be related to any domain specific data.

Figure 13A:
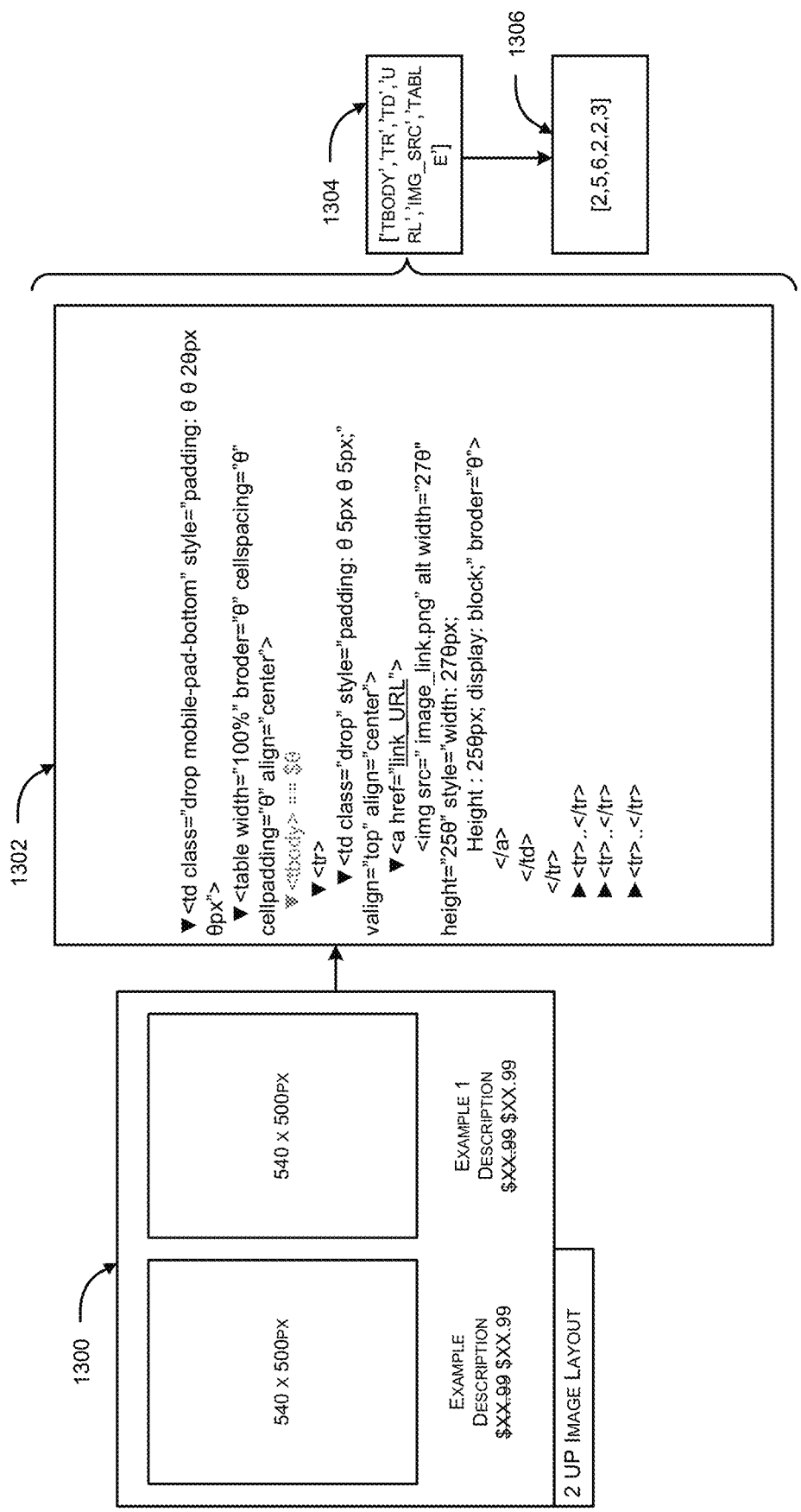
FIGS. 13A-13B illustrate exemplary block diagram representations for comparison of extracted features in module detection, according to an example embodiment of the present disclosure.
Figure 13B:
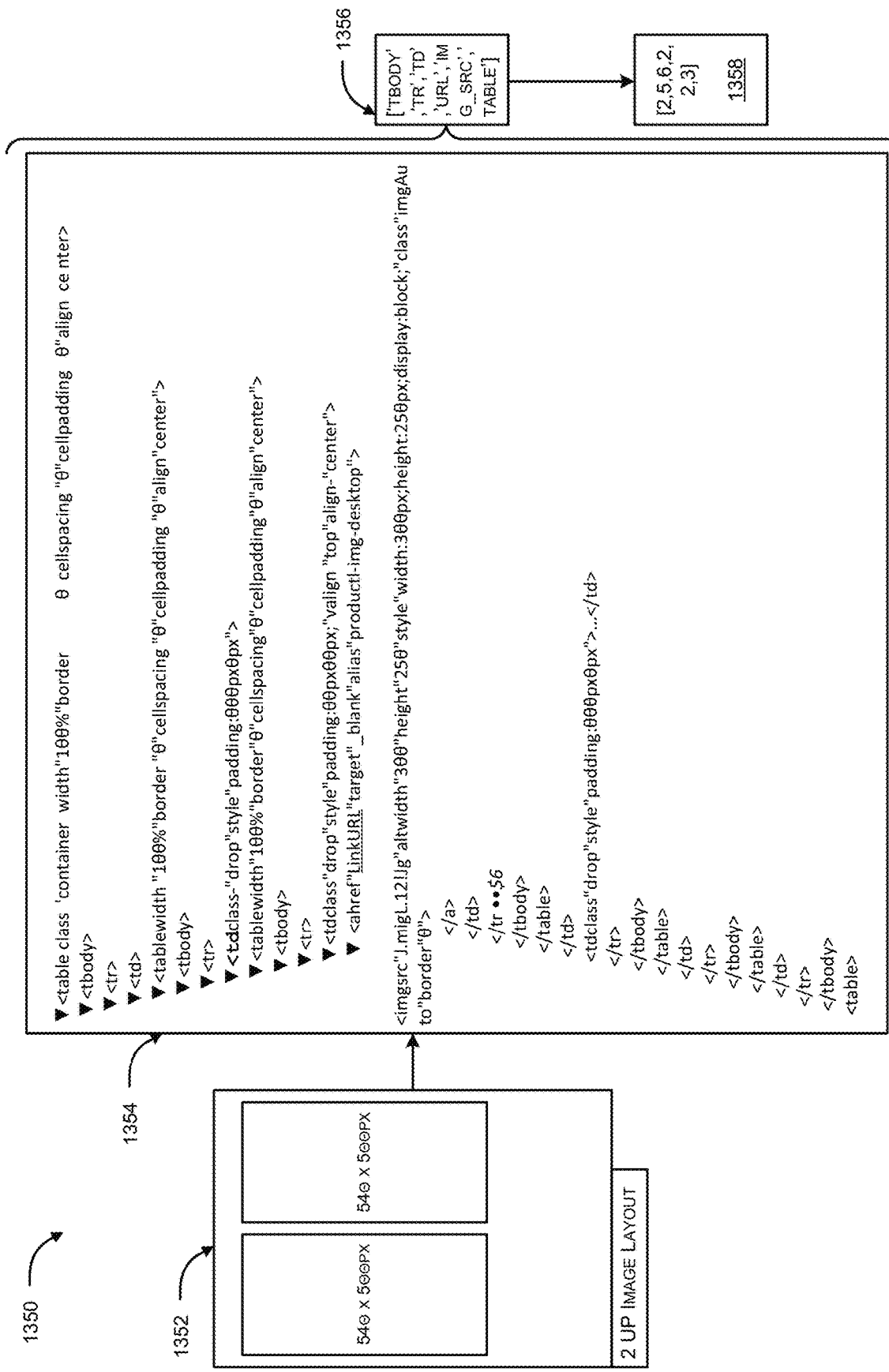

FIGS. 13A-13B illustrate exemplary block diagram representation 1300 and 1350 for comparison of extracted features in module detection, according to an example embodiment of the present disclosure. As shown in FIG. 13A, the representation 1300 may be considered as a support data. In an embodiment, a module detector may extract features of the support data 1300 by converting to a JSON format 1302. For example, the JSON format 1302 may be subjected to extraction of features by a feature extraction module. For example, the extracted features may pertain to number of outer table, inner rows, tables inside the rows, rows inside tables, images, URL links and other such features. For example, the extracted features may be as shown in 1304 i.e. ['TBODY', 'TR', 'TD', 'URL', 'IMG_SRC', 'TABLE'], may pertain to a corresponding vector value as shown in 1306. Similarly as shown in FIG. 13B, the representation 1350 may be considered as a query data 1352. The query data may be derived by choosing one section of the support data.

Figure 14:
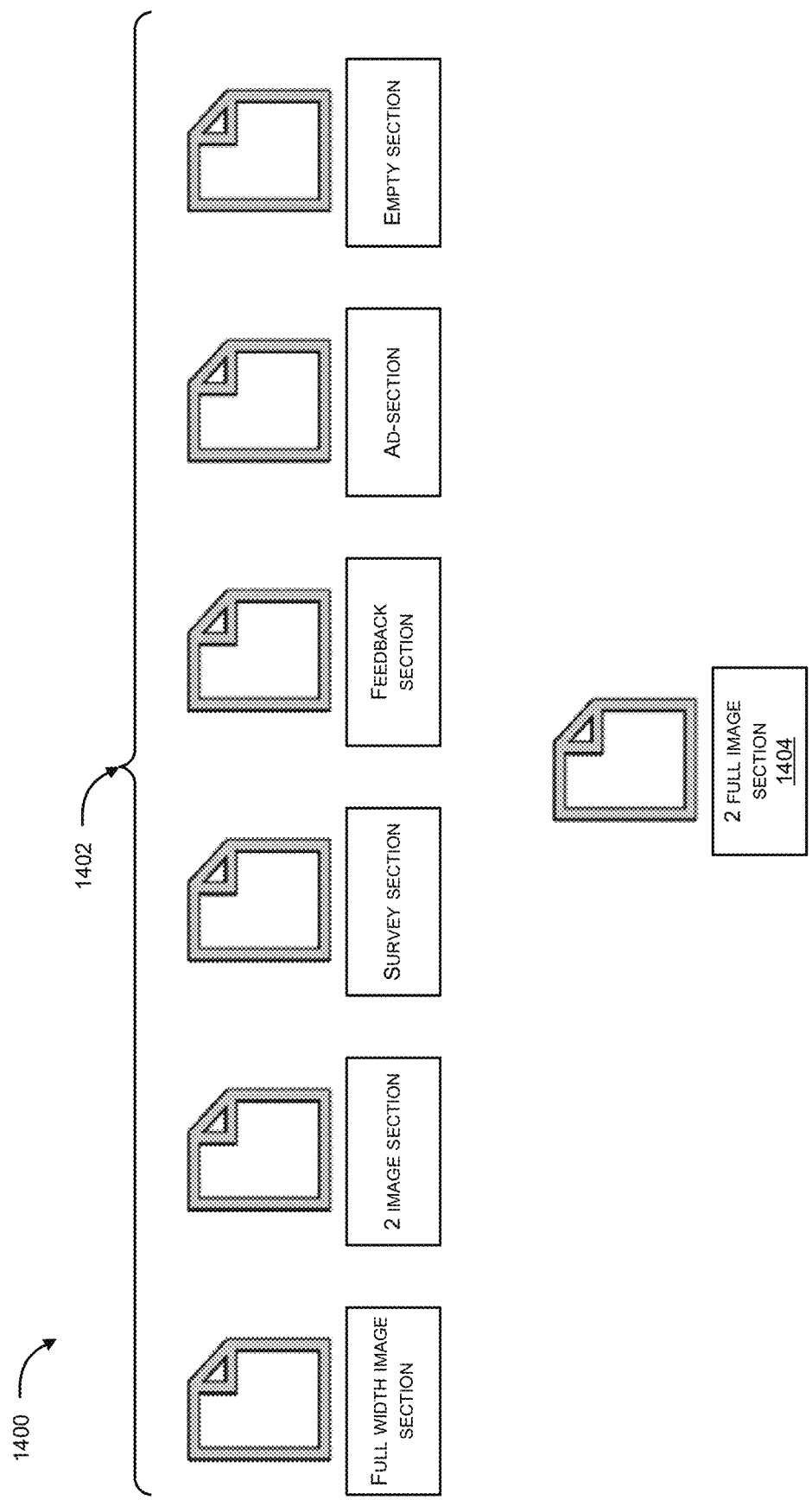
FIG. 14 illustrates an exemplary block diagram representation depicting examples of features of a support data and a query data, according to an example embodiment of the present disclosure.

FIG. 14 illustrates an exemplary block diagram representation 1400 depicting example of features of a support data and a query data, according to an example embodiment of the present disclosure. As shown in FIG. 14, the features as of a support data may include a set of features shown as 1402. The set of features 11402 of the support data may include, for example, full width image section, 2-image section, survey section, feedback section, ad-section and empty section. In this case, as the query data is a single section taken from the query data, the corresponding extracted feature may pertain to one section of the query data, for example, 2 full image section 1404. In an embodiment and as seen in FIGS. 13A-13B, a module detector may extract features of the query data 1352 by converting to a JSON format 1354 to obtain a set of extracted features 1356 having corresponding vector value as shown in 1358. Based on the comparison of the vector values 1306 and 1358 corresponding respectively to the extracted features of the support data 1302 and the query data 1352, the module detector may detect the pre-defined module as explained in FIG. 12. The module detector may rely on similarity between the query data and the support data to provide an output (detected module).

Figure 15:
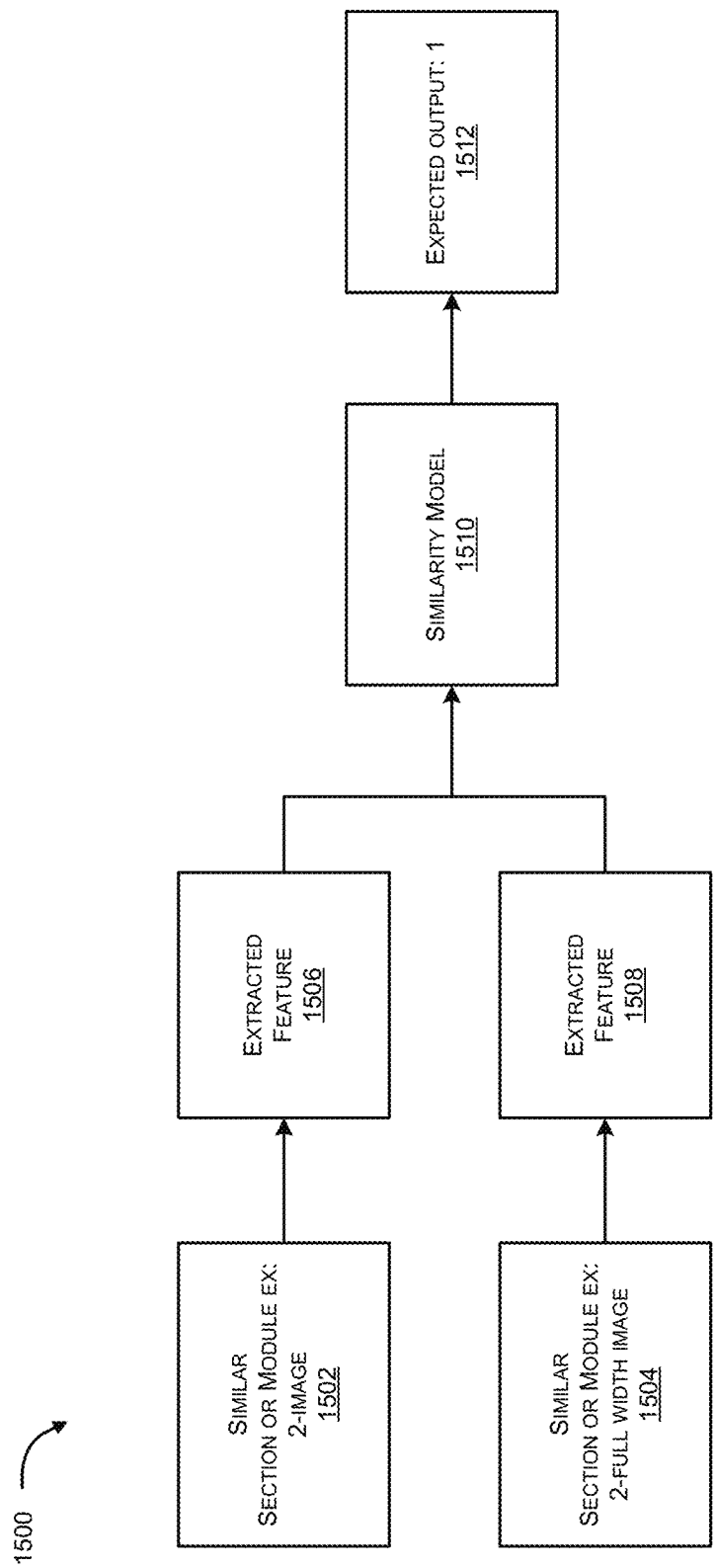
FIG. 15 illustrates an exemplary block diagram representation showing module detection by a similarity model, according to an example embodiment of the present disclosure.

FIG. 15 illustrates an exemplary block diagram representation 1500 showing module detection by a similarity model, according to an example embodiment of the present disclosure. As shown in FIG. 15, a support data 1504 (for example, 2-full width image) may be subjected to extraction of features to obtain extracted features 1508. Similarly, extracted features 1506 may be obtained from a query data 1502 (for example, 2-image). In an embodiment, the extracted features 1508 and 1506 from the support data and the query data, respectively may be provided as an input to a trained model (for example a similarity model 1510) with a function, for example, a softmax activation function. This may assist in providing a similarity score between the query data and the support data as an expected output as 1512. In an embodiment, the query data may be compared against each support data and the similarity score may be measured each time, accordingly. For example, the support data 1504 and the query data 1502 as shown in FIG. 15 may include a high similarity score. In an example embodiment, a pre-defined threshold limit or range may be pre-set for assessing the similarity score for module detection.

Figure 16:
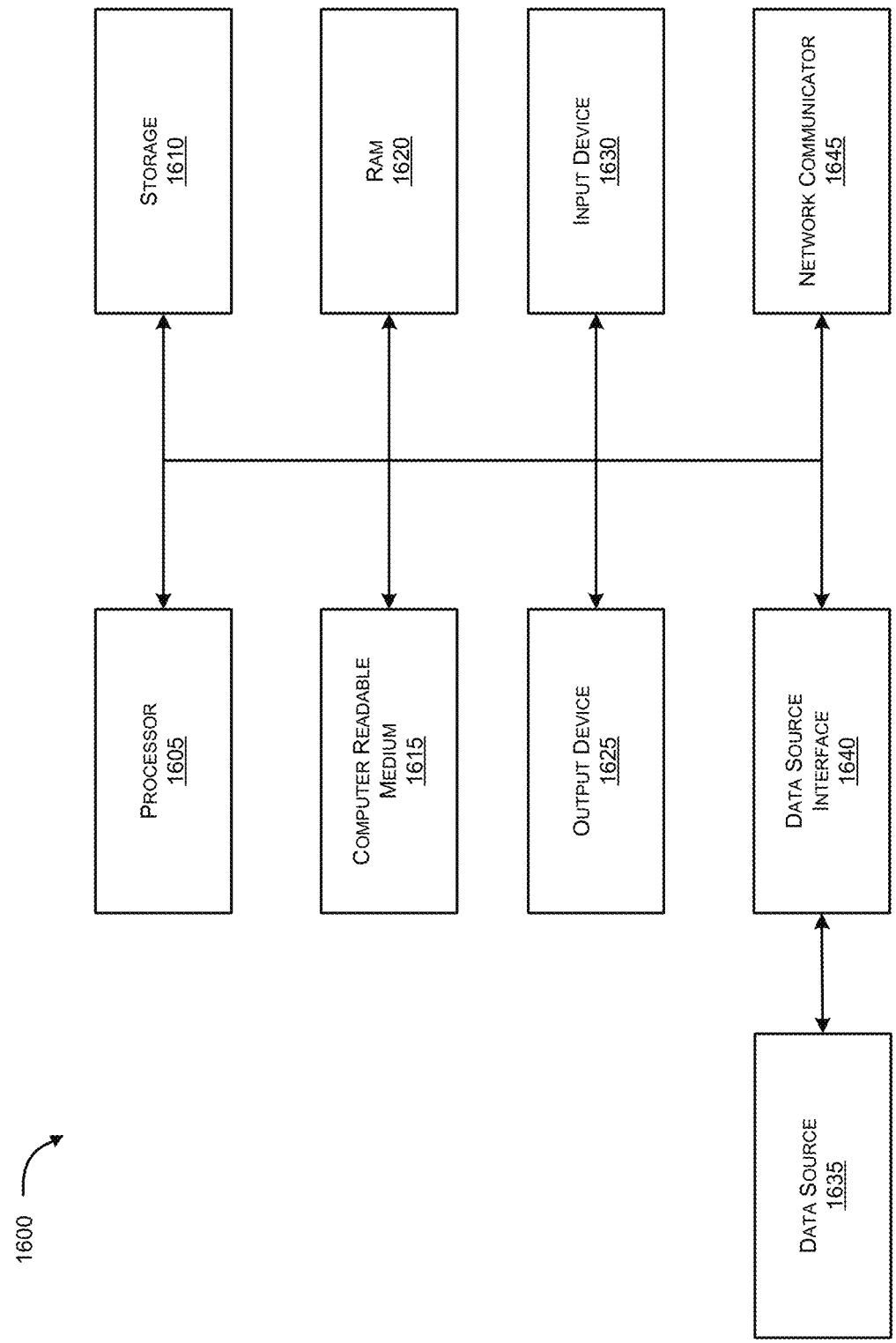
FIG. 16 illustrates a hardware platform for implementation of the disclosed system, according to an example embodiment of the present disclosure.

FIG. 16 illustrates a hardware platform (1600) for implementation of the disclosed system, according to an example embodiment of the present disclosure. For the sake of brevity, construction and operational features of the system 100 which are explained in detail above are not explained in detail herein. Particularly, computing machines such as but not limited to internal/external server clusters, quantum computers, desktops, laptops, smartphones, tablets, and wearables which may be used to execute the system 100 or may include the structure of the hardware platform 1600. As illustrated, the hardware platform 1600 may include additional components not shown, and some of the components described may be removed and/or modified. For example, a computer system with multiple GPUs may be located on external-cloud platforms, or internal corporate cloud computing clusters, or organizational computing resources, etc.

The hardware platform 1600 may be a computer system such as the system 100 that may be used with the embodiments described herein. The computer system may represent a computational platform that includes components that may be in a server or another computer system. The computer system may execute, by the processor 1605 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 1605 that executes software instructions or code stored on a non-transitory computer-readable storage medium 1615 to perform methods of the present disclosure. The software code includes, for example, instructions to generate output representation. In an example, the representation generator 104, input data evaluator 112 and the self-learning engine 112 may be software codes or components performing these steps.

The instructions on the computer-readable storage medium 1615 are read and stored the instructions in storage 1610 or in random access memory (RAM). The storage 1610 may provide a space for keeping static data where at least some instructions could be stored for later execution. The stored instructions may be further compiled to generate other representations of the instructions and dynamically stored in the RAM such as RAM 1620. The processor 1605 may read instructions from the RAM 1620 and perform actions as instructed.

The computer system may further include the output device 1625 to provide at least some of the results of the execution as output including, but not limited to, visual information to users, such as external agents. The output device 1625 may include a display on computing devices and virtual reality glasses. For example, the display may be a mobile phone screen or a laptop screen. GUIs and/or text may be presented as an output on the display screen. The computer system may further include an input device 1630 to provide a user or another device with mechanisms for entering data and/or otherwise interact with the computer system. The input device 1630 may include, for example, a keyboard, a keypad, a mouse, or a touchscreen. Each of these output device 1625 and input device 1630 may be joined by one or more additional peripherals. For example, the output device 1625 may be used to display the output representation, optimized output representation and/or brief recommendation (feedback) that is generated by the system 100.

A network communicator 1645 may be provided to connect the computer system to a network and in turn to other devices connected to the network including other clients, servers, data stores, and interfaces, for instance. A network communicator 1645 may include, for example, a network adapter such as a LAN adapter or a wireless adapter. The computer system may include a data sources interface 1640 to access the data source 1635. The data source 1635 may be an information resource. As an example, a database of exceptions and rules may be provided as the data source 1635. Moreover, knowledge repositories and curated data may be other examples of the data source 1635.

Figure 17:
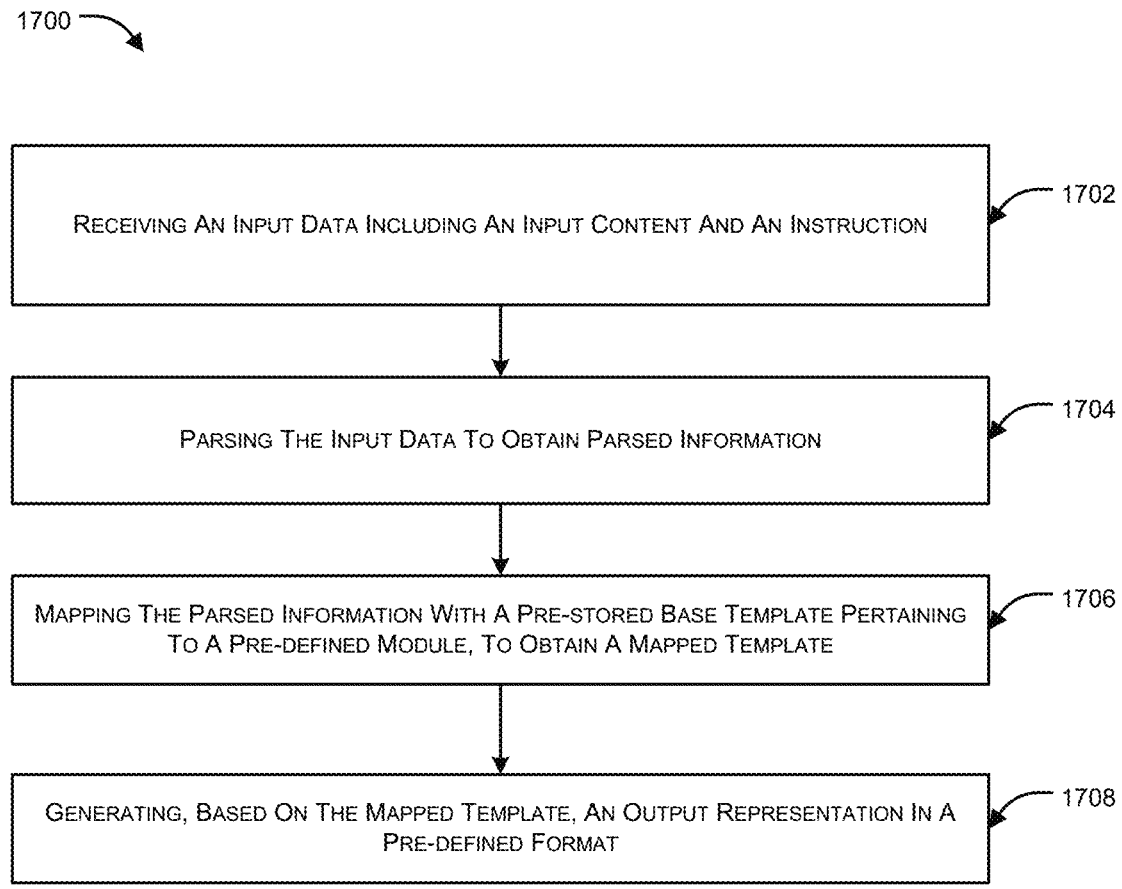
FIG. 17 illustrates a flow diagram for facilitating generation of an output representation, according to an example embodiment of the present disclosure.

FIG. 17 illustrates a flow diagram 1700 for facilitating generation of an output representation, according to an example embodiment of the present disclosure. At 1702, the method includes a step of receiving, by a processor, an input data including an input content and an instruction. In an example embodiment, the input content may include information to be displayed in an expected representation. In an example embodiment, the instruction may correspond to one or more attributes related to the expected representation of the input content. At 1704, the method includes a step of parsing, by the processor, the input data to obtain parsed information. At 1706, the method includes a step of mapping, by the processor, the parsed information with a pre-stored base template to obtain a mapped template. The pre-stored base template may pertain to a pre-defined module. In an embodiment, the mapping may be performed based on comparative identification of pre-defined portions in the pre-stored base template with respect to the parsed information. At 1708, the method includes a step of generating, by the processor, based on the mapped template, an output representation in a pre-defined format. In an example embodiment, the output representation may be generated by retaining, in the pre-stored base template, the corresponding pre-defined portions that are present in the parsed information. The output representation corresponds to the expected representation of the input content.

In an embodiment, the input data, the corresponding output representation and the pre-defined template may be stored in a database coupled to the processor. The database may be an augmented database including pre-stored plurality of case pairs that are used to refine the output representation through a self-learning procedure to obtain an optimized output representation. In an embodiment, each case pair may include a combination of sample input data and a corresponding sample output representation obtained by preceding cycles of feedback-based output generation. In an example embodiment, the feedback may include an annotated feedback including a suggested rectification in the sample output representation with respect to the sample input data.

In an example embodiment, an optimized output representation may be generated by the processor, by a method that may include a step of receiving, by the processor, the input data and the output representation. The method may include a step of identifying, by the processor, based on a comparative analysis, an optimal case pair from the plurality of case pairs in the database. The comparative analysis may include identification of the optimal case pair based on closest similarity between respective instructions in the input data and the sample input data. The method may include a step of executing, by the processor, based on corresponding sample output representation of the optimal case pair, a set of modifications to the output representation to obtain the optimized output representation. In an example embodiment, the set of modifications may correspond to the suggested rectification in the annotated feedback pertaining to preceding cycles of feedback-based output generation.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
    a processor coupled with a memory, wherein the memory stores instructions to be executed by the processor, the processor comprising:
    a representation generator to:
        receive an input data comprising an input content and a plurality of instructions, wherein the input content comprises information to be displayed in an expected representation, and the plurality of instructions correspond to one or more attributes related to the expected representation of the input content, wherein the plurality of instructions comprise a graphical instruction, a textual instruction, a strike-through instruction, an annotated instruction and a referencing instruction, wherein the input data comprises a scanned or digital document including overlaid annotations, and the instructions are extracted using an object detection model trained on a dataset of annotated templates across different domains, and
        wherein each of the graphical instruction, the textual instruction, the strike-through instruction, the annotated instruction and the referencing instruction are detected using one of image processing methods, object detection methods and index detection methods;
        parse, through a parsing engine of the representation generator, the input data to obtain parsed information, wherein the parsing engine is configured to tokenize content blocks, detect layout components based on bounding box metadata, and associate extracted instructions with respective content segments based on their spatial coordinates;
        map, through a mapping engine of the representation generator, the parsed information with a pre-stored base template pertaining to a pre-defined module, to obtain a mapped template, wherein the mapping is performed based on comparative identification of pre-defined portions in the pre-stored base template with respect to the parsed information; and generate, through a machine learning (ML) model, based on the mapped template, an output representation in a pre-defined format, wherein the output representation is generated by retaining, in the pre-stored base template, the corresponding pre-defined portions that are present in the parsed information, wherein the output representation corresponds to the expected representation of the input content, and wherein the output representation comprises a plurality of data elements represented in the pre-defined format of representation, wherein the plurality of data elements comprise images, headers, uniform resource locator (URL) link, fonts, styles, tables, graphs, paragraphs, sections, references, footers,
a video link and signatures, and wherein the output representation is rendered in HTML or PDF using a rendering engine, wherein the rendering engine is selected from a library of pre-trained rendering modules using a classification model that assigns a document type-confidence score;
a self-learning engine implemented via the processor, the self-learning engine including an artificial intelligence (AI) model to perform a self-learning procedure to obtain an optimized output representation, wherein the AI model corresponds to a feature vector-based estimation of similarity metrics, and wherein the similarity metrics comprise at least one of a cosine similarity and an Euclidean distance, wherein the self-learning engine is to:
receive the input data and the output representation;
assign a feature vector value for each section within the received input data;
identify, based on a comparative analysis, an optimal case pair from a plurality of case pairs in a database, wherein the comparative analysis includes identification of an optimal case pair based on closest similarity between respective instructions in the input data and a sample input data, wherein a case corresponds to the plurality of instructions in the input data for obtaining the output representation, and wherein the optimal case pair corresponds to a combination of the plurality of instructions, and the corresponding output representation that is to be generated; and
execute, through the AI model, based on corresponding sample output representation of the optimal case pair, a set of modifications to the output representation to obtain the optimized output representation, and wherein the set of modifications corresponds to a suggested rectification in annotated feedback pertaining to preceding cycles of a feedback-based output generation, and wherein the annotated feedback is received via a graphical user interface enabling users to provide section-level corrections, with the self-learning engine dynamically updating its model parameters using an online learning mechanism after each feedback instance.

2. The system as claimed in claim 1, wherein the input data, the corresponding output representation and the pre-defined template are stored in a database coupled to the processor.

3. The system as claimed in claim 2, wherein the database is an augmented database comprising pre-stored plurality of case pairs that are used to refine the output representation through a self-learning procedure to obtain an optimized output representation.

4. The system as claimed in claim 3, wherein each case pair includes a combination of sample input data and a corresponding sample output representation obtained by preceding cycles of feedback-based output generation, and wherein the feedback includes an annotated feedback including a suggested rectification in the sample output representation with respect to the sample input data.

5. The system as claimed in claim 1, wherein the parsing engine generates the parsed information based on identification of a corresponding section in the input data that stores the instruction and the input content such that the identified section is classified to obtain the parsed information, wherein the classification is performed by Term Frequency-Inverse Document Frequency (TFIDF) vector.

6. The system as claimed in claim 5, wherein the system comprises:
an input data evaluator implemented via a processor to:
generate a second file pertaining to the output representation, wherein the second file includes a JSON format;
identify a variation in the instruction corresponding to the second file with respect to the instruction in the first file; and generate, based on the identified variation, a recommendation feedback for optimization of the instruction in the input data.

7. The system as claimed in claim 1, wherein the system comprises a module detector to detect a module from a plurality of pre-defined modules for generating the output representation through the mapping.

8. The system as claimed in claim 7, wherein the module is detected, using a library, based on similarity of extracted features corresponding to the mapped template and the input content of the input data.

9. The system as claimed in claim 8, wherein the module includes at least one of a classification model or a similarity model, and wherein the module, using the library, facilitates replacement of one or more features in the mapped template with the input content of the input data.

10. The system as claimed in claim 1, wherein the pre-defined format of the output representation includes at least one of a hypertext markup language (HTML) format or a pdf format.

11. The system as claimed in claim 1, wherein the input data includes a plurality of data elements including at least one of images, headers, uniform resource locator (URL) link, fonts, styles, tables, graphs, paragraphs, sections, references, footers, video link or signatures.

12. A method for generating an output representation, the method comprising:
receiving, by a processor, an input data comprising an input content and plurality of instructions, wherein the input content comprises information to be displayed in an expected representation, and the plurality of instructions correspond to one or more attributes related to the expected representation of the input content, wherein the plurality of instructions comprise at a graphical instruction, a textual instruction, a strike-through instruction, an annotated instruction and a referencing instruction, wherein the input data comprises a scanned or digital document including overlaid annotations, and the instructions are extracted using an object detection model trained on a dataset of annotated templates across different domains, and
wherein each of the graphical instruction, the textual instruction, the strike-through instruction, the anno-tated instruction and the referencing instruction are detected using one of image processing methods, object detection methods and index detection methods;

parsing, by the processor, the input data to obtain parsed information, wherein the parsing engine is configured to tokenize content blocks, detect layout components based on bounding box metadata, and associate extracted instructions with respective content segments based on their spatial coordinates;

mapping, by the processor, the parsed information with a pre-stored base template pertaining to a pre-defined module, to obtain a mapped template, wherein the mapping is performed based on comparative identification of pre-defined portions in the pre-stored base template with respect to the parsed information generating, by the processor, based on the mapped template, an output representation in a pre-defined format, wherein the output representation is generated by retaining, in the pre-stored base template, the corresponding pre-defined portions that are present in the parsed information, wherein the output representation corresponds to the expected representation of the input content and wherein the output representation comprises a plurality of data elements represented in the pre-defined format of representation, wherein the plurality of data elements comprise of images, headers, uniform resource locator (URL) link, fonts, styles, tables, graphs, paragraphs, sections, references, footers, a video link and signatures, wherein the output representation is rendered in HTML or PDF using a rendering engine, wherein the rendering engine is selected from a library of pre-trained rendering modules using a classification model that assigns a document type-confidence score;

receiving, by the processor, the input data, and the output representation;

assigning, by the processor, a feature vector value for each section within the received input data;

identifying, by the processor, based on a comparative analysis, an optimal case pair from a plurality of case pairs in a database, wherein the comparative analysis includes identification of the optimal case pair based on closest similarity between respective instructions in the input data and a sample input data, wherein a case corresponds to the plurality of instructions in the input data for obtaining the output representation, and wherein the optimal case pair corresponds to a combination of the plurality of instructions, and the corresponding output representation that is to be generated; and executing, by the processor, based on corresponding sample output representation of the optimal case pair, a set of modifications to the output representation to obtain an optimized output representation, and wherein the set of modifications corresponds to a suggested rectification in annotated feedback pertaining to preceding cycles of a feedback based output generation, wherein the optimized output representation is obtained by using an artificial intelligence (AI) model, wherein the AI model corresponds to a feature vector based estimation of similarity metrics, and wherein the similarity metrics comprise at least one of a cosine similarity and an Euclidean distance, and wherein the annotated feedback is received via a graphical user interface enabling users to provide section-level corrections, with the self-learning engine dynamically updating its model parameters using an online learning mechanism after each feedback instance.

13. The method as claimed in claim 12, wherein the input data, the corresponding output representation and the pre-defined template are stored in a database coupled to the processor, wherein the database is an augmented database comprising pre-stored plurality of case pairs that are used to refine the output representation through a self-learning procedure to obtain an optimized output representation.

14. The method as claimed in claim 12, wherein each case pair includes a combination of sample input data and a corresponding sample output representation obtained by preceding cycles of feedback-based output generation, and wherein the feedback includes an annotated feedback including a suggested rectification in the sample output representation with respect to the sample input data.

15. A non-transitory computer readable medium, wherein the readable medium comprises machine executable instructions that are executable by a processor to:

receive an input data comprising an input content and a plurality of instructions, wherein the input content comprises information to be displayed in an expected representation, and the plurality of instructions correspond to one or more attributes related to the expected representation of the input content, wherein the plurality of instructions comprise comprises at least one of a graphical instruction, a textual instruction, a strike through instruction, an annotated instruction and a referencing instruction, wherein the input data comprises a scanned or digital document including overlaid annotations, and the instructions are extracted using an object detection model trained on a dataset of annotated templates across different domains, and wherein each of the graphical instruction, the textual instruction, the strike through instruction, the annotated instruction and the referencing instruction are detected using one of image processing methods, object detection methods and index detection methods;

parse the input data to obtain parsed information, wherein the parsing engine is configured to tokenize content blocks, detect layout components based on bounding box metadata, and associate extracted instructions with respective content segments based on their spatial coordinates;

map the parsed information with a pre-stored base template pertaining to a pre defined module, to obtain a mapped template, wherein the mapping is performed based on comparative identification of pre-defined portions in the pre-stored base template with respect to the parsed information;

generate based on the mapped template, an output representation in a pre-defined format, wherein the output representation is generated by retaining, in the pre-stored base template, the corresponding pre-defined portions that are present in the parsed information, wherein the output representation corresponds to the expected representation of the input content and wherein the output representation comprises a plurality of data elements represented in the pre-defined format of representation, wherein the plurality of data elements comprise images, headers, uniform resource locator (URL) link, fonts, styles, tables, graphs, paragraphs, sections, references, footers, a video link and signatures, wherein the output representation is rendered in HTML or PDF using a rendering engine, wherein the rendering engine is selected from a library of pre-trained rendering modules using a classification model that assigns a document type-confidence score;
receive the input data and the output representation;
assign a feature vector value for each section within the received input data;
identify based on a comparative analysis, an optimal case pair from the plurality of case pairs in the database, wherein the comparative analysis includes identification of the optimal case pair based on closest similarity between respective instructions in the input data and the sample input data, wherein a case corresponds to the plurality of instructions in the input data for obtaining the output representation, and wherein the optimal case pair corresponds to a combination of the plurality of instructions, and the corresponding output representation that is to be generated; and
execute, based on corresponding sample output representation of the optimal case pair, a set of modifications to the output representation to obtain the optimized output representation, and wherein the set of modifications corresponds to a suggested rectification in annotated feedback pertaining to preceding cycles of feedback-based output generation, wherein the optimized output representation is obtained by using an artificial intelligence (AI) model, wherein the AI model corresponds to a feature vector based estimation of similarity metrics, and wherein the similarity metrics comprise at least one of a cosine similarity and an Euclidean distance, and wherein the annotated feedback is received via a graphical user interface enabling users to provide section-level corrections, with the self-learning engine dynamically updating its model parameters using an online learning mechanism after each feedback instance.

* * * * *